(12) United States Patent
Kubo et al.

(10) Patent No.: US 9,807,267 B2
(45) Date of Patent: Oct. 31, 2017

(54) AUTOMATIC DOCUMENT FEEDER, IMAGE FORMING DEVICE, AND IMAGE READING DEVICE

(71) Applicants: Hiroshi Kubo, Kanagawa (JP); Norio Kimura, Kanagawa (JP); Shinya Kitaoka, Kanagawa (JP); Atsushi Kanaya, Kanagawa (JP); Yoshito Suzuki, Kanagawa (JP)

(72) Inventors: Hiroshi Kubo, Kanagawa (JP); Norio Kimura, Kanagawa (JP); Shinya Kitaoka, Kanagawa (JP); Atsushi Kanaya, Kanagawa (JP); Yoshito Suzuki, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 0 days.

(21) Appl. No.: 14/972,784

(22) Filed: Dec. 17, 2015

(65) Prior Publication Data

US 2016/0198059 A1 Jul. 7, 2016

(30) Foreign Application Priority Data

Jan. 5, 2015 (JP) .................................. 2015-000419

(51) Int. Cl.
*H04N 1/00* (2006.01)

(52) U.S. Cl.
CPC ....... *H04N 1/00896* (2013.01); *H04N 1/0032* (2013.01); *H04N 1/0057* (2013.01); *H04N 1/00748* (2013.01); *H04N 2201/0094* (2013.01)

(58) Field of Classification Search
CPC .................................................. H04N 1/00896

USPC ................................................. 358/1.13, 1.15
See application file for complete search history.

(56) References Cited

U.S. PATENT DOCUMENTS

| 2007/0109610 A1 | 5/2007 | Sasaki |
| 2012/0236353 A1 | 9/2012 | Nagayama |
| 2013/0187326 A1* | 7/2013 | Tu ........................ B65H 3/0684 |
| | | 271/10.11 |

(Continued)

FOREIGN PATENT DOCUMENTS

| JP | H11-060053 | 3/1999 |
| JP | 2006-142779 | 6/2006 |

(Continued)

*Primary Examiner* — Jacky X Zheng
(74) *Attorney, Agent, or Firm* — Harness, Dickey & Pierce, P.L.C.

(57) ABSTRACT

An automatic document feeder includes: a recording-medium set unit, on which a recording medium is set; a recording-medium set detecting unit that detects whether the recording medium is set on the recording-medium set unit; a conveying unit that conveys the recording medium; a sheet-feeding cover section that constitutes part of the conveying unit and that includes an openable and closable sheet feeding cover; and a control unit that separately receives a power-on signal, which is output when a power source of an image forming device including the automatic document feeder is turned on, and an energy-saving return signal, which is output when a return is made from an energy saving state where a power source of part of the device is disconnected. When the power-on signal is received, the control unit performs an initialization operation to initialize each unit of the automatic document feeder.

18 Claims, 18 Drawing Sheets

(56) References Cited

U.S. PATENT DOCUMENTS

| | | | |
|---|---|---|---|
| 2013/0215481 A1* | 8/2013 | Hayasaka | G03G 15/607 358/498 |
| 2015/0055157 A1* | 2/2015 | Hamano | H04N 1/00037 358/1.12 |
| 2015/0256701 A1 | 9/2015 | Kimura et al. | |
| 2015/0264194 A1 | 9/2015 | Kubo et al. | |

FOREIGN PATENT DOCUMENTS

| | | |
|---|---|---|
| JP | 2007-142759 | 6/2007 |
| JP | 2012-213133 | 11/2012 |
| JP | 2013-088704 | 5/2013 |

* cited by examiner

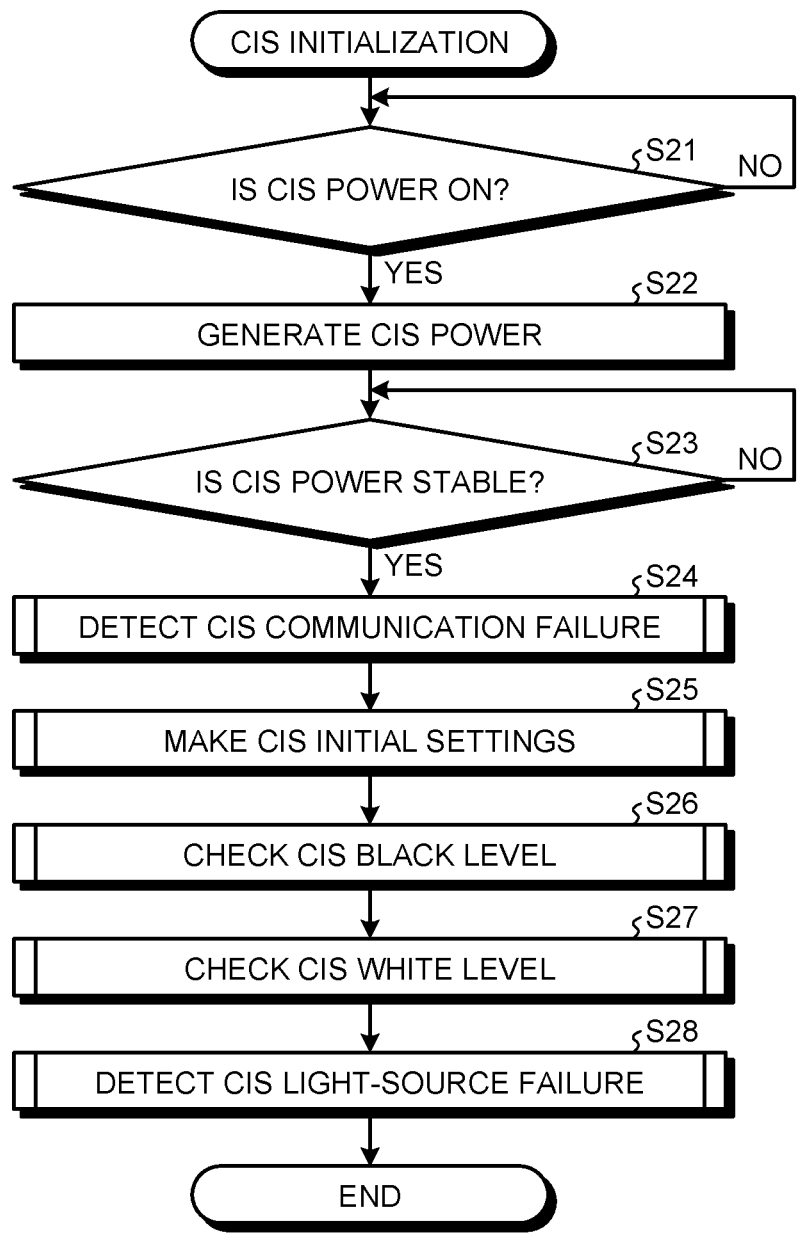

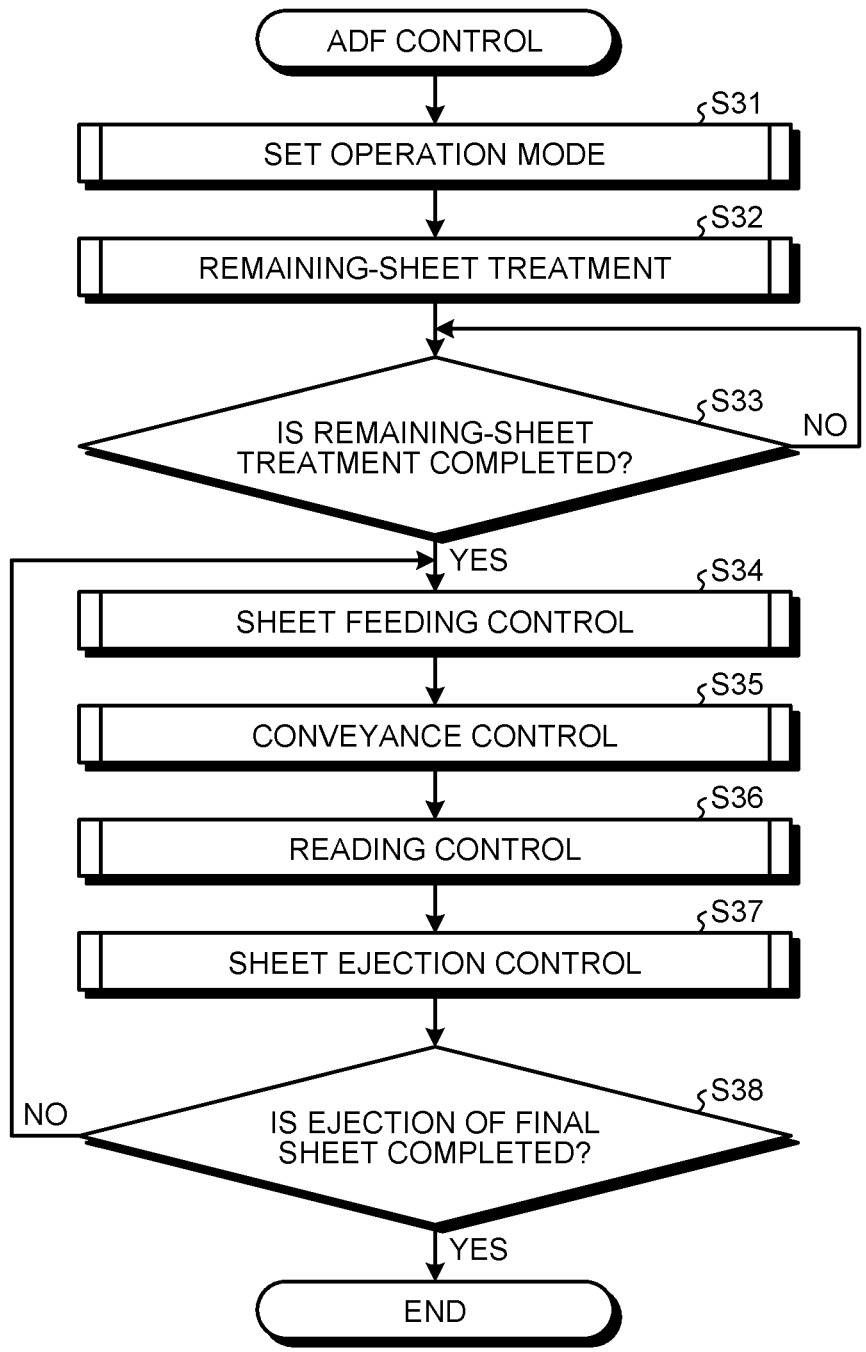

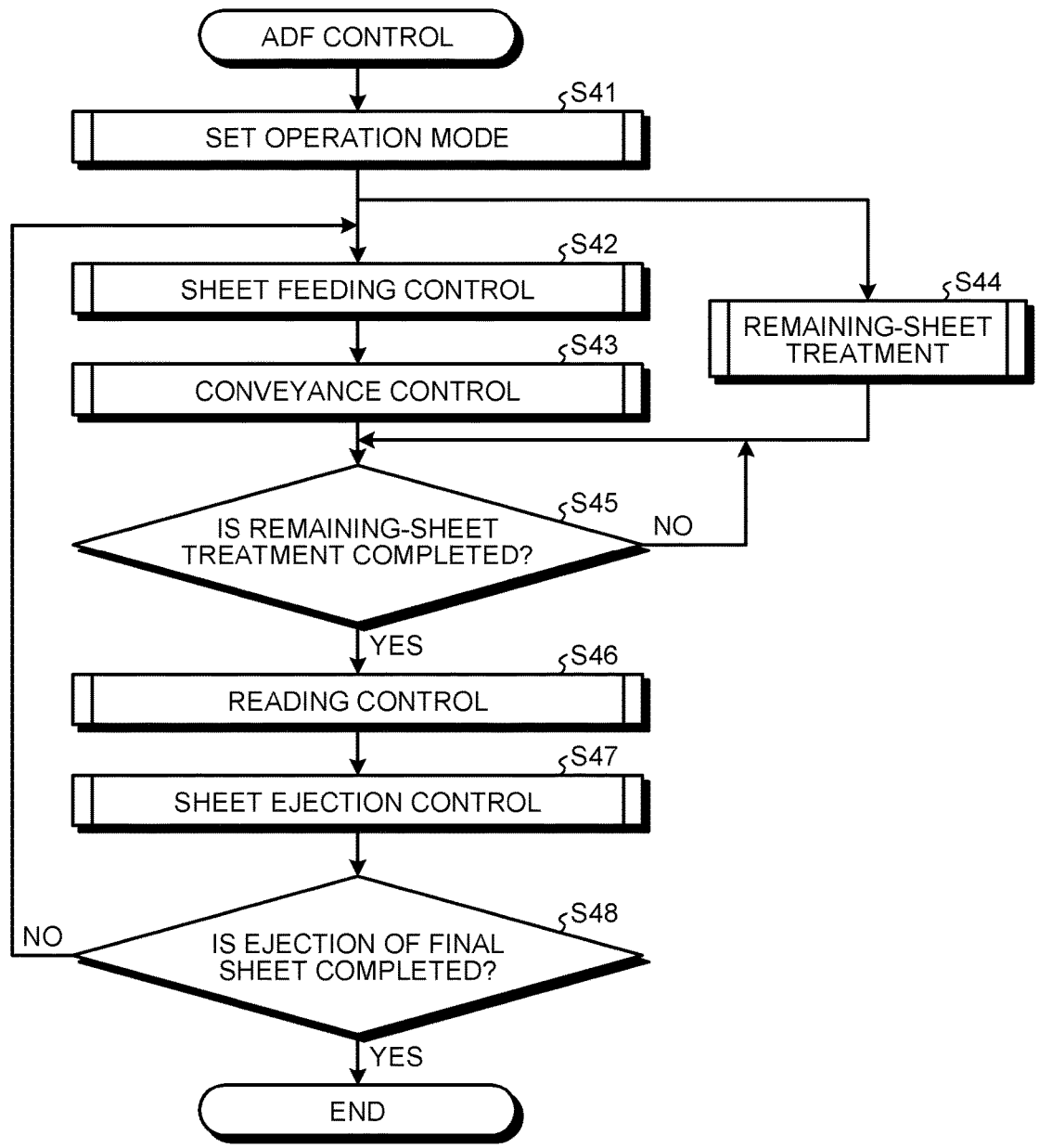

ary feeder, an image forming device, and an image reading device.

2. Description of the Related Art

In recent years, there has been higher demand for reduction in the sound of copiers than ever before. For example, with regard to the noise standard of the German environment standard (BAM), although the target is conventionally the noise level of a copier alone, the range of targets has been recently expanded to the noise level of, not only a copier alone, but also an image forming device that includes an automatic document feeder (ADF), which is conventionally treated as a peripheral device.

Furthermore, there is a market demand for reduction in, not only the normal operation sound, but also noise that occurs during an initialization operation to initialize the state of the device when it is started up, what is called initialization sound.

The initialization operation is performed based on the assumption of the occurrence of the state where a document remains at the position where it cannot be detected by a sensor within the device or the state where a unit is not in the home position, which is caused when the user moves a unit while the power source of the image forming device is off, the power source is suddenly disconnected, or the like.

Usually, in the case of image forming devices, such as copiers, in which ADFs are implemented, a user often leaves it as the main power source is on so that the user may use it instantaneously when he/she wants to. Therefore, there are disclosed image forming devices that perform the function to make an automatic switchover to a low-consumption power mode, what is called an energy saving mode, when the unused state continues for a certain period of time in order to reduce the power consumption during a stand-by state (for example, see Japanese Laid-open Patent Publication No. 2012-213133).

Japanese Laid-open Patent Publication No. 2012-213133 discloses the case where the image forming device performs different operations when the power source is turned on and when a return is made from the energy saving mode (hereafter, simply referred to as "energy saving return") in the purpose of energy saving.

However, in conventional image forming devices that are disclosed in Japanese Laid-open Patent Publication No. 2012-213133, the initialization operation is uniformly performed when the power source of the main body of the image forming device is turned on or when a return is made from the energy saving mode. Therefore, there is a problem in that, the initialization operation is performed in a case where the initialization operation is not necessary, i.e., the case where each unit is in the home position and no documents remain within the device, and initialization sound occurs each time.

In view of the above, there is a need to provide an automatic document feeder, an image forming device, and an image reading device, which perform an initialization operation only when a predetermined condition is satisfied so that the noise of the device can be reduced.

SUMMARY OF THE INVENTION

It is an object of the present invention to at least partially solve the problems in the conventional technology.

An automatic document feeder is included in an image forming device that can enter an energy saving state, where a power source of part of the device is disconnected. A power source of the automatic document feeder is turned on when a power source of the image forming device is turned on or when a return is made from the energy saving state. The automatic document feeder includes: a recording-medium set unit, on which a recording medium is set; a recording-medium set detecting unit that detects whether the recording medium is set on the recording-medium set unit; a conveying unit that conveys the recording medium that is set on the recording-medium set unit; a sheet-feeding cover section that constitutes part of the conveying unit and that includes an openable and closable sheet feeding cover; and a control unit that separately receives a power-on signal, which is output when the power source of the image forming device is turned on, and an energy-saving return signal, which is output when a return is made from the energy saving state. When the power-on signal is received, the control unit performs an initialization operation to initialize each unit of the automatic document feeder.

An automatic document feeder is included in an image forming device that can enter an energy saving state, where a power source of part of the device is disconnected. A power source of the automatic document feeder is turned on when a power source of the image forming device is turned on or when a return is made from the energy saving state. The automatic document feeder includes: a sheet stack unit, on which a document sheet is stacked; a separating/feeding unit that separates and feeds a document sheet, stacked on the sheet stack unit, individually; a sheet fetching unit that sequentially delivers a document sheet, stacked on the sheet stack unit, to the separating/feeding unit; a conveying unit that includes a roller for conveying a document sheet, which is separated and fed by the separating/feeding unit, to a predetermined read position; a reading unit that reads an image on a document sheet, which is conveyed to the read position by the conveying unit; a sheet ejecting unit that includes a roller for ejecting a document sheet, for which reading of an image has been completed by the reading unit; a control unit that performs an initialization operation to initialize each unit of the automatic document feeder; and a plurality of sensors that detect a position of the document sheet in the conveying unit and the sheet ejecting unit. Among the sensors, a sensor, provided most downstream in a conveying direction of the document sheet, is located upstream of a roller that is provided most downstream in the conveying direction among multiple rollers that are included in the conveying unit and the sheet ejecting unit. The control unit performs a remaining-sheet treatment to rotate a roller, located downstream of the sensor that is provided most downstream, among the rollers in the conveying direction, after a state where an image is readable is established.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a flowchart that illustrates the flow of an operation during CIS initialization of the ADF according to the second embodiment of the present invention;

FIG. 12 is a flowchart that illustrates an example of the flow of an operation during ADF control of the ADF according to the second embodiment of the present invention;

FIG. 13 is a flowchart that illustrates another example of the flow of an operation during ADF control of the ADF according to the second embodiment of the present invention;

DETAILED DESCRIPTION OF THE PREFERRED EMBODIMENTS

With reference to the drawings, an explanation is given below of an embodiment of the present invention.

First Embodiment

First, an explanation is given of a configuration of an image forming device 1 that includes an automatic document feeder (ADF) 5 according to a first embodiment of the present invention.

Figure 1:
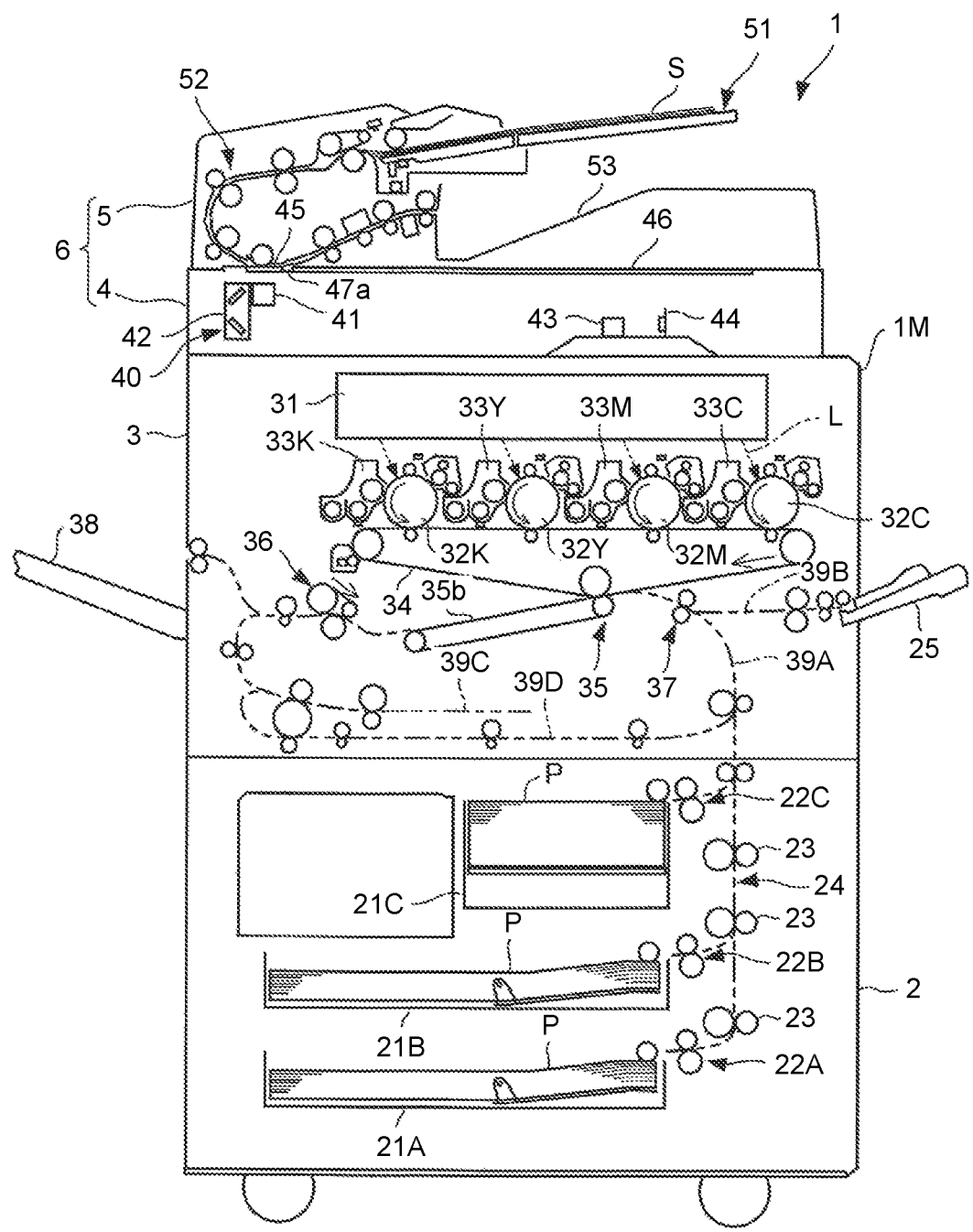
FIG. 1 is a front cross-sectional view that illustrates a schematic configuration of an image forming device that includes an ADF according to a first embodiment of the present invention.

As illustrated in FIG. 1, the image forming device 1 according to the present embodiment is a digital multifunction peripheral that includes a device main body 1M including a sheet feeding device 2, an image forming unit 3, and an image reading unit 4, and an ADF 5 that is mounted on the device main body 1M. The image reading unit 4 and the ADF 5 constitute an image reading device 6.

The sheet feeding device 2 includes sheet feeding cassettes 21A, 21B, and 21C in multiple tiers, where cut-sheet like transfer sheets P may be contained in a stacked state. In each of the sheet feeding cassettes 21A, 21B, and 21C, for example, the transfer sheet P (e.g., white sheet) of the sheet size, which is previously selected from multiple sheet sizes, is housed in a vertical or horizontal sheet feeding direction.

The sheet feeding device 2 includes sheet feeding devices 22A, 22B, and 22C that sequentially pick up the transfer sheet P, contained in each of the sheet feeding cassettes 21A, 21B, and 21C, from the uppermost side thereof and separate and feed the sheet. The sheet feeding device 2 is further provided with various rollers 23, or the like, and they form a sheet feeding path 24 for conveying the transfer sheet P, fed from each of the sheet feeding devices 22A, 22B, and 22C, to a predetermined image formation location of the image forming unit 3.

The image forming unit 3 includes an exposure device 31, photoconductor drums 32K, 32Y, 32M, and 32C, and developing devices 33K, 33Y, 33M, and 33C that are filled with toner of black (K), yellow (Y), magenta (M), and cyan (C). Furthermore, the image forming unit 3 includes a primary transfer unit 34, a secondary transfer unit 35, and a fixing unit 36.

For example, the exposure device 31 generates laser light L for exposure of each color on the basis of the image that is read by the image reading device 6. Furthermore, the exposure device 31 irradiates the photoconductor drums 32K, 32Y, 32M, and 32C of the colors with the laser light, whereby electrostatic latent images of the colors, corresponding to the read image, are formed on the surface layers of the photoconductor drums 32K, 32Y, 32M, and 32C.

Each of the developing devices 33K, 33Y, 33M, and 33C feeds thin-layer toner to a corresponding one of the photoconductor drums 32K, 32Y, 32M, and 32C so as to come close to it, thereby conducting developing to visualize the electrostatic latent images by using toner.

The image forming unit 3 primarily transfers the toner images, developed on the photoconductor drums 32K, 32Y, 32M, and 32C, onto the primary transfer unit 34 and secondarily transfers the toner images onto the transfer sheet P in the secondary transfer unit 35 that is located close to the primary transfer unit 34. Furthermore, in the image forming unit 3, the fixing unit 36 applies heat and pressure to melt the toner image, which has been secondarily transferred onto the transfer sheet P, thereby fixing and recording the color image onto the transfer sheet P.

The image forming unit 3 includes a conveyance path 39A for conveying the transfer sheet P, conveyed from the sheet feeding device 2 via the sheet feeding path 24, toward the secondary transfer unit 35. On the conveyance path 39A, the conveying timing and the conveying speed of the transfer sheet P are first adjusted by a pair of registration rollers 37. Then, the transfer sheet P is passed through the secondary transfer unit 35 and the fixing unit 36 in synchronization with the belt speed in the primary transfer unit 34 and the secondary transfer unit 35 and then is ejected onto a sheet ejection tray 38.

The image forming unit 3 further includes a manual sheet feeding path 39B for feeding a transfer sheet, placed on a manual tray 25, to the conveyance path 39A at the upstream of the pair of registration rollers 37.

Under the secondary transfer unit 35 and the fixing unit 36 are arranged a switchback conveying path 39C and a turnover conveyance path 39D, each of which is configured by using multiple conveyance rollers and conveyance guides, or the like.

When an image is to be formed on both sides of the transfer sheet P, the switchback conveying path 39C conducts switchback conveying to move the transfer sheet P backward (move it in the direction opposite to that while moving it in) after moving in one end of the transfer sheet P that has an image fixed to any one side thereof.

The turnover conveyance path 39D turns over the surfaces of the transfer sheet P, on which switchback conveying has been conducted by the switchback conveying path 39C, and again feeds it to the pair of registration rollers 37.

With the switchback conveying path 39C and the turnover conveyance path 39D, the traveling direction of the transfer sheet P, for which an image fixing operation has been completed for one side thereof, is switched to the opposite direction, and then the surface thereof is turned over and is again moved into the secondary transfer nip. Then, after a secondary transfer operation and a fixing operation are performed on the image on the other side, the transfer sheet P is ejected onto the sheet ejection tray 38.

The image reading unit 4 includes a first carriage 41 that is provided with a light source and a mirror member, a second carriage 42 that is provided with a mirror member, an imaging forming lens 43, an image capturing unit 44, and a first contact glass 45. They are disposed on the side of the device main body 1M, and they constitute a first-surface reading unit 40 that reads the image on the image surface on one side (e.g., the image surface on the front side) of a document sheet S that is a recording medium that is conveyed on the first contact glass 45. Here, the first surface refers to one surface of the document sheet S that is automatically conveyed, for example, the image surface on the front side.

The image reading unit 4 is further provided with a second contact glass 46, on which the document sheet S is placed, an abutment member 47a, which can be caused to abut on one side of the document sheet S and with which the one side of the document sheet S can be held in position, or the like.

The first carriage 41 is provided under the first contact glass 45 and the second contact glass 46 such that it is movable in the horizontal direction of the drawing and the position thereof may be controlled, and the illumination light from the light source is reflected by the mirror member so that it may be emitted toward the exposure surface. The reflected light, which is reflected by the document sheet S, is passed through the mirror members that are provided in the first carriage 41 and the second carriage 42 so that an image is formed by the imaging forming lens 43, and the formed image is read by the image capturing unit 44.

The image reading unit 4 is capable of conducting exposure scanning on the image surface of the document sheet S, which is placed on the second contact glass 46, while moving the first carriage 41 and the second carriage 42 at the speed ratio of, for example, 2:1 in a light-on state of the light source. Then, the image capturing unit 44 reads the document image during the exposure scanning, whereby the image reading unit 4 may perform a fixed-document reading function (what is called, flatbed scanner function).

The image reading unit 4 is capable of stopping the first carriage 41 at a fixed position just under the first contact glass 45. Furthermore, the image reading unit 4 is capable of performing a moving-document reading function (what is called, DF scanner function) to read an image on the first surface of the document sheet S that is the process of automatic document feeding without moving an optical system, such as the light source or a reflection mirror.

The ADF 5 is connected to the upper section of the device main body 1M of the image forming device 1 via a hinge mechanism such that it may be opened and closed. The automatic document feeder 5 is operated such that it is rotated between the open position where the first contact glass 45 and the second contact glass 46 are exposed in the image reading unit 4 and the closed position where the first contact glass 45 and the second contact glass 46 are covered.

The ADF 5 is configured as a sheet-through type automatic document feeder. The ADF 5 includes a document table 51 that is a document placement board; a document conveying section 52 that includes various rollers and guide members, or the like; and a document ejection tray 53 on which the document sheet S is stacked after the image is read. On the document table 51, the bundle of documents, i.e., at least the one cut-sheet like document sheet S, e.g., the multiple document sheets S, may be placed.

The image forming unit 3 includes the exposure device 31, the photoconductor drums 32K, 32Y, 32M, and 32C, and the developing devices 33K, 33Y, 33M, and 33C that are filled with toner of black (K), yellow (Y), magenta (M), and cyan (C). Furthermore, the image forming unit 3 includes the primary transfer unit 34, the secondary transfer unit 35, and the fixing unit 36.

For example, the exposure device 31 generates the laser light L for exposure of each color on the basis of the image that is read by the image reading device 6. The exposure device 31 irradiates the photoconductor drums 32K, 32Y, 32M, and 32C of the colors with light, whereby electrostatic latent images of the colors, corresponding to the read image, are formed on the surface layers of the photoconductor drums 32K, 32Y, 32M, and 32C.

Each of the developing devices 33K, 33Y, 33M, and 33C feeds thin-layer toner to a corresponding one of the photoconductor drums 32K, 32Y, 32M, and 32C, thereby conducting developing to visualize the electrostatic latent images by using toner.

The image forming unit 3 primarily transfers the toner images, developed on the photoconductor drums 32K, 32Y, 32M, and 32C, onto the primary transfer unit 34 and secondarily transfers the toner images onto the transfer sheet P in the secondary transfer unit 35 that is located close to the primary transfer unit 34. Furthermore, in the image forming unit 3, the fixing unit 36 applies heat and pressure to melt the toner image, which has been secondarily transferred onto the transfer sheet P, thereby fixing and recording the color image onto the transfer sheet P.

After the full-color image is fixed to the transfer sheet P, which has been conveyed to the fixing unit 36, due to the pressure and the heat within the fixing unit 36, the transfer sheet P is delivered from the fixing unit 36 to a pair of sheet ejection rollers and is ejected onto the sheet ejection tray 38 outside the device.

Figure 2:
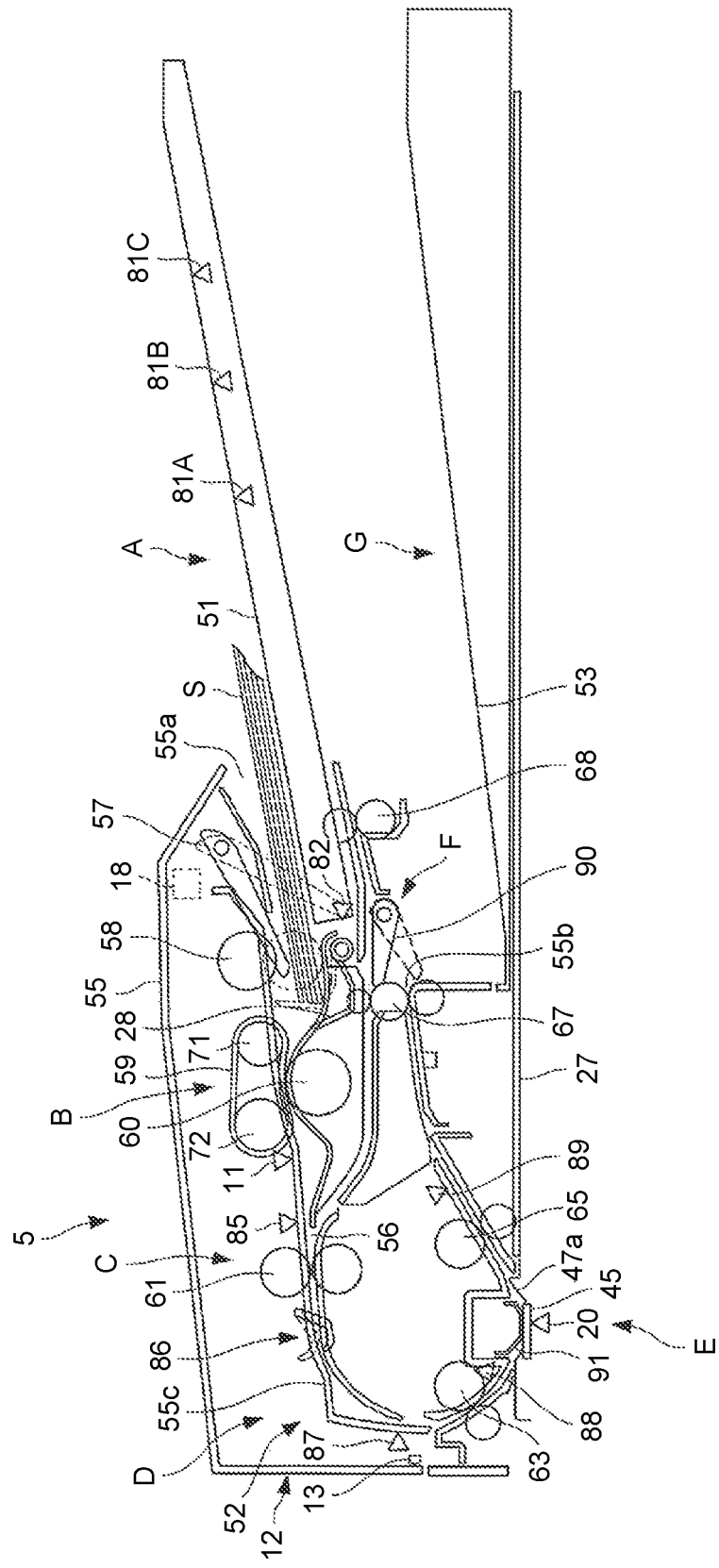
FIG. 2 is a schematic configuration diagram of the ADF according to the first embodiment of the present invention.

As illustrated in FIG. 2, the ADF 5 includes, as multiple functional units, a document set section A, a separating/feeding section B, a registration section C, a turn section D, a reading/conveying section E, a discharge section F, and a stack section G. Among the above-described functional units, the functions of the separating/feeding section B, the registration section C, the turn section D, the reading/conveying section E, and the discharge section F are principally implemented by the document conveying section 52.

The document conveying section 52 is covered by a sheet-feeding cover section 12 such that at least the upper section thereof may be opened and closed. The sheet-feeding cover section 12 includes a sheet feeding opening 55*a*, through which the leading edge of the document sheet S enters the sheet-feeding cover section 12. Furthermore, the sheet-feeding cover section 12 covers the upper area of the end of the document table 51 such that the end of the document table 51 is located on the inner side of the sheet feeding opening 55*a*.

In the document conveying section 52, the area from the sheet feeding opening 55*a* to a sheet ejection opening 55*b*, which is located above the document ejection tray 53, is covered by a rib 55*c*, other guide members, or the like, which are formed on a sheet feeding cover 55, or the like, of the sheet-feeding cover section 12, whereby a document conveyance path 56 is formed.

In the document conveying section 52, a separation sensor 11, an abutment sensor 85, a document width sensor 86, a read entry sensor 87, a registration sensor 88, and a sheet ejection sensor 89 are arranged in this order from the upstream to the downstream in the conveying direction of the document sheet S. These sensors detect the position and the shape of the document sheet S on the document conveyance path 56. Especially, the read entry sensor 87, the registration sensor 88, and the sheet ejection sensor 89 are used to control the conveying distance and the conveying speed of the document sheet S, or the like, and to detect paper jam, or the like.

In the document set section A, in a state where the leading edge of the document bundle of the document sheets S with respect to the feeding direction abuts on a document abutment claw 28, the document bundle is set on the document table 51. In a case where the document sheet S is a one-side document, the document bundle is set on the document table 51 in a state where the front surface thereof faces upward.

In the separating/feeding section B, the topmost one is separated from the document bundle of the document sheets S, placed on the document table 51 in the document set section A, one by one and is fed to the entry of the document conveyance path 56.

The registration section C performs the function to set the desired conveying attitude of the document sheet S, which is sequentially fed from the separating/feeding section B, due to the primary abutment and performs the function to draw and convey the set document sheet S to the downstream.

The turn section D performs the turnover conveyance function to turn over the document sheet S, which is drawn and conveyed from the registration section C, such that the front and back surfaces thereof are reversed, and conveys it so that the front surface of the document sheet S faces downward in the drawing.

The reading/conveying section E causes the turned-over document sheet S from the turn section D to pass through a read position 20 on the first contact glass 45 while conveying it at a predetermined speed in a sub-scanning direction (the direction perpendicular to a main scanning direction that is a document width direction).

The discharge section F discharges the document sheet S, which has been conveyed by the reading/conveying section E and for which the document image reading has been completed, toward the stack section G.

The stack section G sequentially stacks the document sheet S, which is sequentially ejected from the discharge section F, on the document ejection tray 53, located under the document set section A, such that the front surface thereof faces downward. The sequence of pages of the document sheets S, stacked on the stack section G, are the same as those placed in the document set section A, and the whole bundle is stacked such that the side of the document surface is turned upside down.

The document set section A, the separating/feeding section B, the registration section C, the turn section D, the reading/conveying section E, the discharge section F, and the stack section G are controlled by a controller unit 100 for automatic document feeder control, as described later.

The ADF 5 separates the topmost document sheet S from the document bundle of the document sheets S, placed on the document table 51, one by one and, by using the document conveying section 52, conveys it on a predetermined conveyance path that runs on the first contact glass 45. Furthermore, after the image reading unit 4 reads the image of the document sheet S when the document sheet S passes the first contact glass 45, the ADF 5 ejects the document sheet S onto the document ejection tray 53.

The document table 51, on which the document sheet S is placed such that it faces upward, is provided such that it is tilted so that, if the side of the document conveying section 52 is the side of the leading edge of the document sheet S, the side of the leading edge is down, and the side of the trailing edge is up.

Furthermore, the ADF 5 includes document length sensors 81A to 81C that are provided on the document table 51 such that they are spaced apart in the feeding direction. The document length sensors 81A to 81C are configured by using, for example, known reflection-type photo sensors; however, this is not a limitation, and they may be micro switches or photo sensors that detect an operation of an actuator that includes a spring or a hinge lever.

As illustrated in FIG. 2, the document length sensors 81A to 81C detect the general length of the document bundle in a state where the leading edge of the document bundle of the document sheets S abuts on the document abutment claw 28 and the document bundle is set on the document table 51. Here, the document abutment claw 28 adjusts the attitude of the document bundle that is set on the document table 51.

The ADF 5 includes a document set filler 57 that is rotated by the document sheet S, placed on the document table 51, above the end of the document table 51, i.e., the upstream end on the side of the sheet feeding opening 55*a*, by using the document conveying direction of the document sheet S as a reference.

Furthermore, the ADF 5 includes a document set sensor 82 that detects whether the document sheet S is set on the document table 51 by detecting the lowermost part of the movement trajectory of the end of the document set filler 57 in the vicinity of the bottom surface near the end of the document table 51. The document set sensor 82 detects whether the document set filler 57 is rotated so that it is separated from the document set sensor 82, thereby detecting the presence or absence of the document sheet S that is set on the document table 51.

Furthermore, the ADF 5 includes a pressure plate section 27 that is formed into a flat plate shape and is provided such that it is opposed to the second contact glass 46. The pressure plate section 27 is configured to press t a book or a document to be read against the second contact glass 46.

The document conveying section 52 includes a pickup roller 58, which is a fetching roller, located near the inner side of the sheet feeding opening 55*a* and includes an endless sheet feeding belt 59 and a reverse roller 60 (sheet feeding unit) that are provided such that they are opposed to each other with the document conveyance path 56 interposed therebetween.

The pickup roller 58 is moved vertically via a cam mechanism so that, at the contact position, the several (ideally, single) document sheets S are conveyed with friction and picked up from the topmost side of the document sheets S, stacked on the document table 51, so as to be sequentially fetched into a separation unit. Here, the separation unit includes a drive roller 71, a driven roller 72, the sheet feeding belt 59, and the reverse roller 60.

The sheet feeding belt 59 is rotated in the conveying direction of the document sheet S by the drive roller 71 that is driven by a sheet feeding motor 102 that is described later.

The reverse roller 60 is rotatable in the direction opposite to the feeding direction of the sheet feeding belt 59, and it is configured such that the topmost document sheet S and the underlying document sheet S are separated so that only the topmost document sheet S may be fed. Furthermore, the reverse roller 60 includes a torque limiter. The reverse roller 60 is in contact with the sheet feeding belt 59 at a predetermined pressure and, in a state where it is in direct contact with the sheet feeding belt 59 or is in contact via the single document sheet S, the torque limiter is operated so that the reverse roller 60 is rotated together with the sheet feeding belt 59.

If the multiple document sheets S enter the gap between the sheet feeding belt 59 and the reverse roller 60, the rotation force of the reverse roller 60 in the counterclockwise direction becomes lower than the force that corresponds to the set torque of the torque limiter. Thus, the reverse roller 60 is rotated in the clockwise direction that is the original drive direction to push back the excess document sheet S, thereby preventing the multiple document sheets S from being delivered.

The document sheet S, which has been separated individually due to the action of the sheet feeding belt 59 and the reverse roller 60, is further delivered by the sheet feeding belt 59 so that the leading edge thereof is detected by the abutment sensor 85, and it is further conveyed so that it abuts on a stopped conveyance roller 61 that is described later. The abutment sensor 85 is provided between the sheet feeding belt 59 and the conveyance roller 61, and it is configured so as to detect the leading edge and the trailing edge of the document sheet S.

Furthermore, the document conveying section 52 includes the conveyance roller 61 that is a pull-out roller that is opposed to the document sheet S with the document conveyance path 56 interposed therebetween so as to nip and convey it; a conveyance roller 63 that is a read entry roller; and a conveyance roller 65 that is a read exit roller. Each conveyance roller is configured to include, for example, a pair or small and large rollers that are adjacent to each other in the radial direction with the document conveyance path 56 interposed therebetween to form a nip; however, the number of rollers arranged in the axial direction is optional. The number of arranged conveyance rollers and the arrangement location are set as appropriate depending on the path design of the document conveyance path 56, the length of the document sheet S of the minimum size in the document conveying direction, allowed by the ADF 5, or the like.

The document sheet S is conveyed by a predetermined distance after being detected by the abutment sensor 85, and it is pressed against the conveyance roller 61 with a predetermined bend. In this state, the sheet feeding motor 102, described later, is stopped so that the driving of the sheet feeding belt 59 is stopped.

At that point, the pickup roller 58 is retracted from the top surface of the document sheet S in accordance with the rotation of the pickup lifting/lowering motor 101, which is described later. In this way, the document sheet S is conveyed with only the conveyance force of the sheet feeding belt 59 so that the leading edge of the document sheet S enters the nip of the conveyance roller 61, i.e., the pair of upper and lower rollers, whereby alignment (skew correction) of the leading edge is conducted.

The conveyance roller 61 is driven in accordance with the reverse rotation of a pull-out motor 113, which is described later. During the reverse rotation of the pull-out motor 113, the conveyance roller 61 is driven; however, the pickup roller 58 and the sheet feeding belt 59 are not driven. As described above, as the conveyance roller 61 is driven by the pull-out motor 113 that is an independent driving source, the time to start up or stop the motor may be shortened, whereby the productivity is improved.

In accordance with the drive timing of the pickup roller 58, the conveyance roller 61 corrects skew by causing the leading edge of the fed document sheet S to abut on it, and it pulls out and conveys the corrected document sheet S in the conveying direction.

Furthermore, the conveying speed of the document sheet S that is conveyed from the registration section C to the turn section D in accordance with the driving of the conveyance roller 61 is set to be higher than the conveying speed of the document sheet S in the reading/conveying section E. Thus, it is possible to shorten the processing time to convey the document sheet S to the reading/conveying section E.

Furthermore, the document width sensor 86 is provided downstream of the conveyance roller 61, and it detects the size of the document sheet S, conveyed by the conveyance roller 61, in the width direction that is perpendicular to the conveying direction. The document width sensor 86 may include, for example, multiple light emitting elements that are arranged in the width direction of the document sheet S and include light receiving elements that are arranged in the positions opposite to the light emitting elements with the document conveyance path 56 interposed therebetween. Furthermore, the abutment sensor 85 reads the leading edge and the trailing edge of the document sheet S so that the length of the document sheet S in the conveying direction may be detected by using the pulse counts of the motor.

When the read entry sensor 87 detects the leading edge of the document sheet S, the ADF 5 starts to reduce the speed such that the conveying speed of the document sheet S becomes a predetermined speed before the leading edge of the document sheet S enters the nip of the conveyance roller 63, i.e., the pair of upper and lower rollers. Simultaneously, the ADF 5 drives the conveyance roller 63 and the conveyance roller 65 by driving a read motor 103 for normal rotation.

The conveyance roller 63 conveys the document sheet S toward a document read guide 91. The conveyance roller 65 conveys the document sheet S, which has passed the first contact glass 45 of the image reading unit 4 that is opposed to the document read guide 91 and for which the reading has been completed, toward the discharge section F. The document read guide 91 guides the document sheet S that is passing the first contact glass 45 of the image reading unit 4.

Furthermore, the document conveying section 52 includes a sheet ejection roller 67, a reverse roller 68, and a bifurcating claw 90.

The sheet ejection roller 67 ejects the document sheet S, conveyed by the conveyance roller 65, onto the document ejection tray 53. Furthermore, the sheet ejection roller 67 conveys the document sheet S, which is reversed by the reverse roller 68 and the bifurcating claw 90, toward the conveyance roller 61.

If the reading of the front surface of the document sheet S is completed and the reading of the back surface is to be further conducted, the reverse roller 68 does not discharge the document sheet S onto the document ejection tray 53 but reverses the document sheet S so that it is conveyed toward the conveyance roller 61 by using the bifurcating claw 90 as a guide.

Figure 3A:
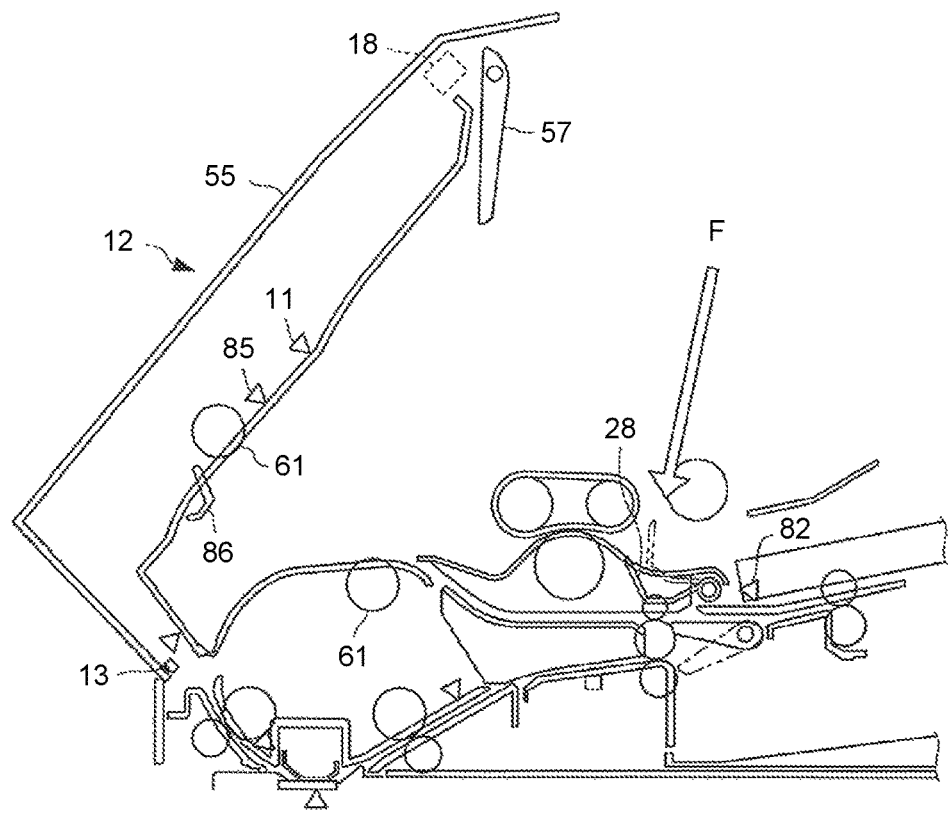
FIGS. 3A and 3B are schematic cross-sectional views of the ADF according to the first embodiment of the present invention, and they illustrate an open state and a closed state of a sheet-feeding cover section.
Figure 3B:
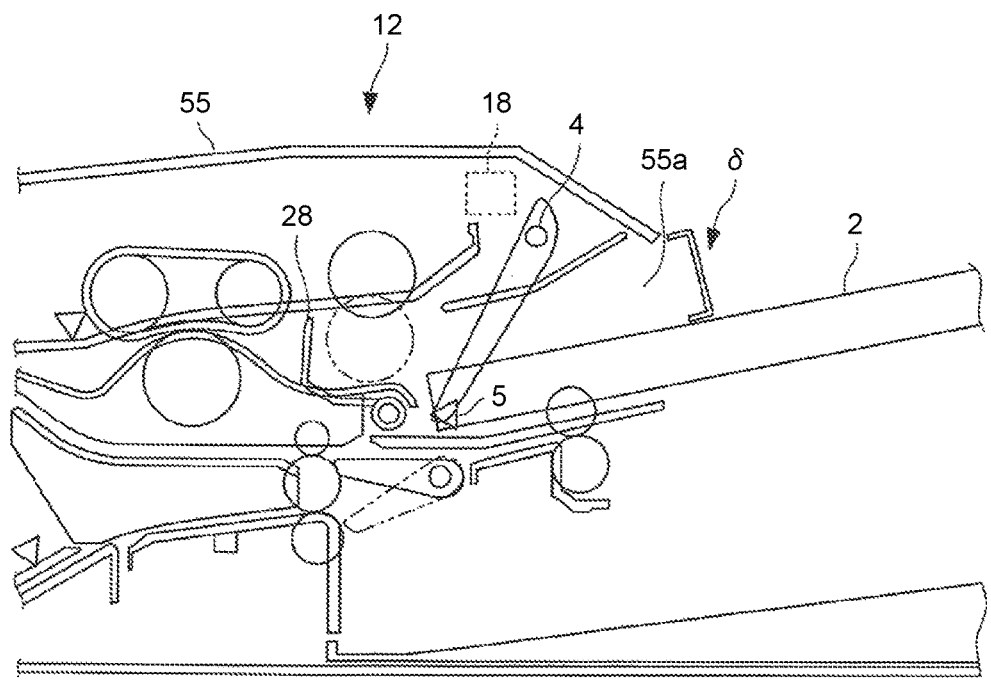

As illustrated in FIGS. 3A and 3B, the sheet-feeding cover section 12 is configured to include the sheet feeding cover 55, an opening/closing mechanism 13 that opens and closes the sheet feeding cover 55, and an open/close sensor 18. The sheet feeding cover 55 is configured as a cover that spreads over part of the document conveying section 52. The sheet feeding cover 55 supports the driven roller of the conveyance roller 61 in the document conveying section 52 and the document set filler 57.

The opening/closing mechanism 13 includes mechanisms, such as a rotation shaft and a bearing that supports the rotation shaft, and it is capable of opening and closing the sheet feeding cover 55 around the rotation shaft in a direction away from the document table 51 and the document conveying section 52. If the document sheet S is pushed and jammed in a component, such as a roller, while it is being conveyed in the document conveying section 52, the user may perform a paper jam operation to open the sheet feeding cover 55 and remove the jammed document sheet S.

As illustrated in FIGS. 3A and 3B, the open/close sensor 18 is provided inside the sheet-feeding cover section 12, for example, and it detects the open state and the closed state of the sheet feeding cover 55 of the sheet-feeding cover section 12. It is appropriate if the open/close sensor 18 detects the open state and the closed state of the sheet feeding cover 55 and, for example, it is configured by a known device that includes a transmission-type photo sensor that is turned on when the sheet feeding cover 55 is opened and a shielding member is retracted so that light is transmitted. Furthermore, the open/close sensor 18 may be a micro switch that detects an operation of an actuator that includes a spring or a hinge lever.

Figure 4:
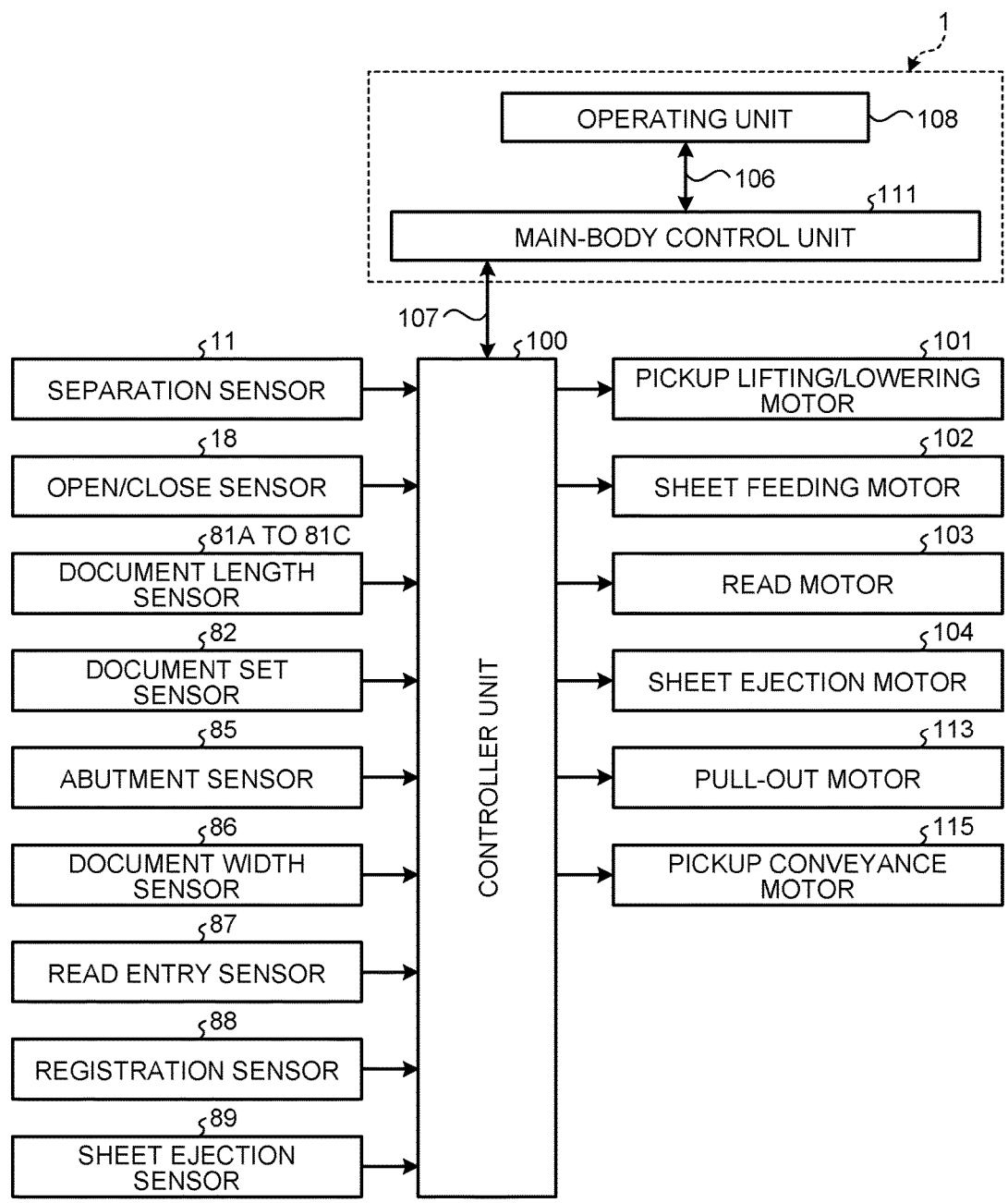
FIG. 4 is a block diagram that illustrates the control configuration of the ADF according to the first embodiment of the present invention.

As illustrated in FIG. 4, the image forming device 1 includes the controller unit 100 for automatic document feeding control; a main-body control unit 111 for device main-body control; and an operating unit 108 that is attached to the main-body control unit 111.

The operating unit 108 includes a start button (print key), a touch panel, or the like. The controller unit 100 is connected to the main-body control unit 111 via an interface 107. When the start button of the operating unit 108 is pressed, the main-body control unit 111 transmits a document feeding signal or a read start signal to the controller unit 100 via the interface 107.

The controller unit 100 receives detection signals from the separation sensor 11, the open/close sensor 18, the document length sensors 81A to 81C, the document set sensor 82, the abutment sensor 85, the document width sensor 86, the read entry sensor 87, the registration sensor 88, and the sheet ejection sensor 89.

The controller unit 100 operates the pickup lifting/lowering motor 101 that lifts and lowers the pickup roller 58, the sheet feeding motor 102 that drives the sheet feeding belt 59, and the read motor 103 that drives the conveyance rollers 63, 65, and the document abutment claw 28.

Furthermore, the controller unit 100 operates a sheet ejection motor 104 that drives the sheet ejection roller 67, the pull-out motor 113 that drives the conveyance roller 61, and a pickup conveyance motor 115 that rotates the pickup roller 58.

When the registration sensor 88 detects the leading edge of the document sheet S, the controller unit 100 reduces the conveying speed over a predetermined conveying distance and temporarily stops the document sheet S before the read position 20. At this point, the controller unit 100 transmits a conveyance stop signal to the main-body control unit 111 via the interface 107. Hereafter, the position of the leading edge of the document sheet S upon transmission of the conveyance stop signal is also referred to as the registration position.

Next, when the main-body control unit 111 receives the read start signal, the controller unit 100 conveys the temporarily stopped document sheet S while increasing the speed such that it becomes a predetermined conveying speed before the leading edge of the document sheet S reaches the read position 20.

At the timing when the leading edge of the document sheet S reaches the first-surface reading unit 40, the controller unit 100 transmits, to the main-body control unit 111, the gate signal that indicates the sub-scanning direction valid image area of the first surface until the trailing edge of the document sheet S passes through the first-surface reading unit 40. Here, the above-described timing is detected by using the pulse counts of the read motor 103 after the read entry sensor 87 detects the leading edge of the document sheet S.

After the document sheet S passes through the reading/conveying section E, it is conveyed to the discharge section F. At this point, when the sheet ejection sensor 89 detects the leading edge of the document sheet S, the controller unit 100 drives the sheet ejection motor 104 for normal rotation so that the sheet ejection roller 67 is rotated in a counterclockwise direction. Furthermore, the controller unit 100 conveys the document sheet S corresponding to a predetermined pulse on the basis of the pulse counts of the sheet ejection motor after the leading edge of the document sheet S is detected by the sheet ejection sensor 89. At this point, the controller unit 100 reduces the driving speed of the sheet ejection motor 104 just before the trailing edge of the document sheet S passes through the nip of the sheet ejection roller 67, i.e., the pair of upper and lower rollers, thereby performing a control to prevent the document sheet S, which is ejected onto the document ejection tray 53, from jumping out.

Here, an explanation is given of the energy saving mode of the image forming device 1. During the energy saving mode, for example, the power for sensing is supplied to only the operating unit 108, the document set sensor 82 of the ADF 5, or the like, which is a trigger when the user uses the image forming device 1, and the other power sources are disconnected. In this way, the image forming device 1 turns off the power sources other than the power source for sensing during the energy saving mode, whereby the low power consumption is achieved.

When the document sheet S is set on the document table 51 during the energy saving mode, the document set sensor 82 detects that the document sheet S is set on the document table 51, whereby the state is obtained such that the image forming device 1 returns from the energy saving mode. Furthermore, the image forming device 1 returns from the energy saving mode when the touch panel of the operating unit 108, or the like, is operated during the energy saving mode.

During the energy saving mode, in the image forming device 1, when a document sheet is set on the ADF 5 by the user as described above, or the operating unit 108 is operated, an initialization operation of the image forming device 1, including the ADF 5, is performed so that the image forming device 1 is started up again. The image forming device 1 returns to the operating mode state (ADF ready) that allows automatic document feeding only after the above process.

Therefore, during return from the energy saving mode, the image forming device 1 cannot be operated during the time from when the initialization operation of the ADF 5 is started to when it is completed (hereinafter, also referred to as "ADF initialization time"). Therefore, to use the image forming device 1 in the energy saving mode, the user waits until the ADF 5 returns to the operable state (ADF ready) and the state is such that the image forming device 1 may be operated.

Furthermore, the operation of the image forming device 1 during the ADF initialization time is not possible not only in the case of the return from the energy saving mode as described above but also in a case where the main power source of the image forming device 1 is turned on in accordance with a user's operation.

During the return from the energy saving mode, an energy-saving return signal is output from the main-body control unit 111 and is received by the controller unit 100. When the energy-saving return signal is received by the controller unit 100, the power source of the ADF 5 is turned on.

Furthermore, if the main power source of the image forming device 1 is switched from off to on, the power-on signal is output from the main-body control unit 111 and is received by the controller unit 100. When the controller unit 100 receives the power-on signal, the power source of the ADF 5 is turned on. The power-on signal and the energy-saving return signal are received as different signals by the controller unit 100.

Furthermore, while the main power source of the image forming device 1 is on, if the sheet feeding cover 55 is in an open state, an open signal is output from the main-body control unit 111 and, if the sheet feeding cover 55 is in a closed state, a closed signal is output, and they are received by the controller unit 100. If the controller unit 100 receives the open signal or the closed signal, the power source of the ADF 5 is turned on.

Figure 5A:
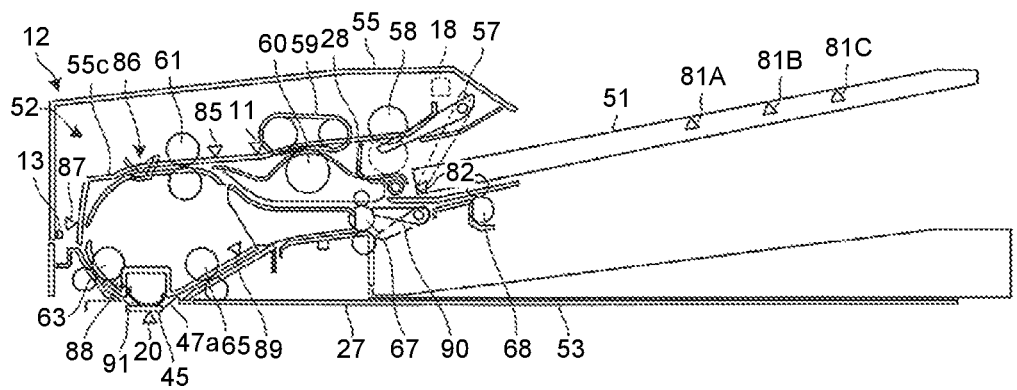
FIGS. 5A to 5C are schematic cross-sectional views of the ADF according to the first embodiment of the present invention, and they illustrate the position of a document abutment claw.
Figure 5B:
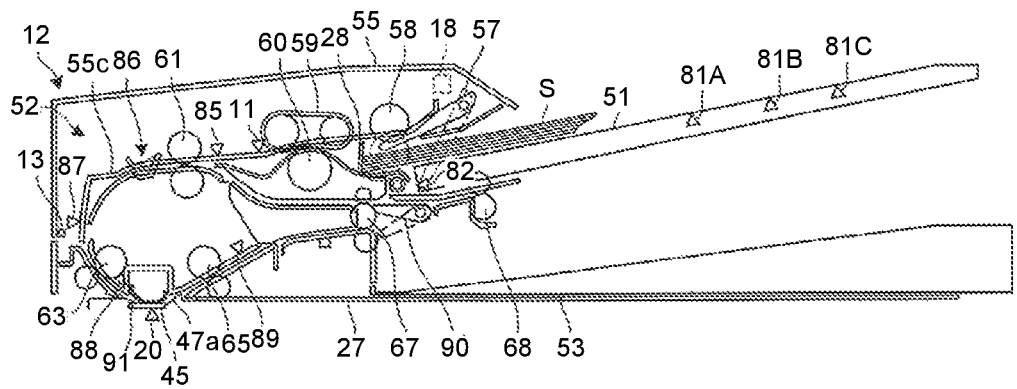
Figure 5C:
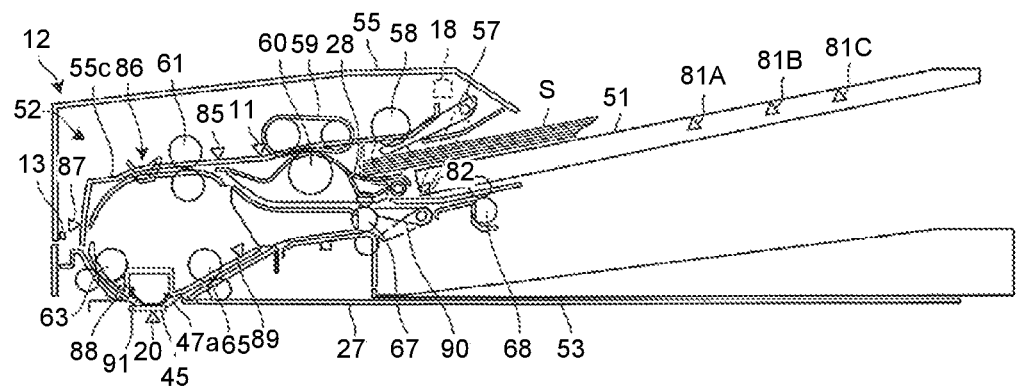

FIGS. 5A to 5C are diagrams that illustrate an operation of the document abutment claw 28. The document abutment claw 28 is configured to take the position (home position), in which the leading edge of the document sheet S, placed on the document table 51, abuts on, and the position for feeding the document sheet S. The above position of the document abutment claw 28 is changed not by a dedicated solenoid but by driving the read motor 103.

If the document sheet S is not set on the document table 51, the document abutment claw 28 is in a lifted-up state as illustrated in FIG. 5A. Here, the position of the document abutment claw 28, illustrated in FIG. 5A, is the home position of the document abutment claw 28.

If the start button of the operating unit 108 is not pressed although the document sheet S is set on the document table 51, the document abutment claw 28 is also located in the home position as illustrated in FIG. 5B.

Conversely, if the document sheet S is set on the document table 51 and the start button of the operating unit 108 is pressed, the document abutment claw 28 is in the position such that it is lowered from the home position as illustrated in FIG. 5C, whereby a state is obtained such that sheets may be fed.

Then, after reading of all the document sheets S, placed on the document table 51, is completed, the read motor 103 is rotated in reverse for a predetermined degree so that the document abutment claw 28 returns to the home position. That is, while the document sheet S is not conveyed, the document abutment claw 28 is always located in the home position.

An explanation is given below of an initialization operation of the document abutment claw 28. If the document abutment claw 28 is not located in the home position to restrict the attitude of the document sheet S when the document sheet S is set, the conveyance performance is decreased. For example, if the document sheet S, being bent, is set on the document table 51, a skew correction is sometimes guaranteed.

When the main power source of the image forming device 1 is off, there is a possibility that the user touches the document abutment claw 28 by hand, or the like, to lower the document abutment claw 28 from the home position and, in such a case, a skew correction is sometimes affected. Therefore, the document abutment claw 28 is a target for the initialization operation.

In conventional ADFs, the initialization operation is performed in any case under the following conditions 1 to 3.

Condition 1: when the main power source of the image forming device is on

Condition 2: when a return is made from the energy saving mode by opening and closing the sheet feeding cover Condition 3: when a return is made from the energy saving mode not by opening and closing the sheet feeding cover As described below, the ADF 5 according to the present embodiment performs the initialization operation in the case of the above-described conditions 1 and 2 and does not perform the initialization operation in the case of the condition 3.

<The Case of the Condition 1>

As illustrated in FIG. 3A, when the main power source of the image forming device 1 is off, there is a possibility that the user opens the sheet feeding cover 55 and pushes down the document abutment claw 28 from the home position, indicated by the dashed line, to the position indicated by the solid line. Therefore, under the condition 1, in which the main power source of the image forming device 1 is on, it is necessary to perform the initialization operation to return the document abutment claw 28 to the home position. Therefore, the controller unit 100 performs the initialization operation if a power-on signal is received.

<The Case of the Condition 2>

As illustrated in FIG. 3A, when the user opens the sheet feeding cover 55 during the energy saving mode, the end portion of the document set filler 57 is not detected by the document set sensor 82 in the same manner as in the case where the document sheet S is set on the document table 51. Therefore, the image forming device 1 enters the state such that it returns from the energy saving mode.

At this point, as the sheet feeding cover 55 is in an open state, there is a possibility that the user pushes down the document abutment claw 28 from the home position (dashed line). Therefore, under the condition 2, in which a return is made from the energy saving mode, it is necessary to perform the initialization operation to return the document abutment claw 28 to the home position after the sheet feeding cover 55 is closed. Therefore, the controller unit 100 performs the initialization operation if an energy-saving return signal, an open signal, or a closed signal is received.

<The Case of the Condition 3>

While the sheet feeding cover 55 is in the closed state as illustrated in FIG. 3B, it is difficult for the user to touch the document abutment claw 28 with the finger being inserted in a narrow space δ of the sheet feeding opening 55a. Therefore, under the condition 3, in which a return is made from the energy saving mode when the document sheet S is set on the document table 51, or the like, without opening and closing the sheet feeding cover 55, it is actually impossible for the user to push down the document abutment claw 28 from the home position; thus, it is not necessary to perform the initialization operation.

Therefore, if only an energy-saving return signal is received among a power-on signal, an energy-saving return signal, an open signal, and a closed signal when a return is made from the energy saving mode, the controller unit 100 omits the execution of the initialization operation.

Furthermore, preferably, it is possible to set execution/inexecution of the initialization operation in accordance with an operation of the operating unit 108 so that the initialization operation may be performed on the document abutment claw 28 as needed even in the case of the condition 3.

As described above, the ADF 5 according to the present embodiment includes the controller unit 100 that separately receives a power-on signal, which is output when the power source of the image forming device 1 is turned on, and an energy-saving return signal, which is output when a return is made from the energy saving state. Furthermore, when a power-on signal is received, the controller unit 100 performs the initialization operation to initialize each unit of the ADF 5. Thus, as the initialization operation is performed only if a predetermined condition is satisfied, it is possible to reduce noises when the image forming device 1 is started up or when a return is made from the energy saving mode.

Furthermore, during the energy saving state, if the sheet feeding cover 55 of the sheet-feeding cover section 12 is switched from the open state to the closed state, the controller unit 100 receives an energy-saving return signal, an open signal, and a closed signal and performs the initialization operation. Thus, as the initialization operation is performed only if a predetermined condition is satisfied, it is possible to reduce noises during the return from the energy saving mode and to ensure that a skew correction is performed on the document sheet S.

Furthermore, if sett of the document sheet S is detected by the document set sensor 82 while the sheet feeding cover 55 of the sheet-feeding cover section 12 is closed in the energy saving state, the controller unit 100 receives an energy-saving return signal and does not perform the initialization operation. Thus, the execution of the initialization operation is omitted so that it is possible to reduce noises during the return from the energy saving mode.

Second Embodiment

Next, with reference to the drawings, an explanation is given of the image forming device 1 that includes the ADF 5 according to a second embodiment of the present invention. Here, the explanations of the same configuration and operation as those of the first embodiment are omitted as appropriate.

In recent years, there have been disclosed devices that include multiple loads for which a start-up time is required and that reduces the time that elapses before an operation of the device is started, i.e., the ADF initialization time (for example, see Japanese Laid-open Patent Publication No. 2006-142779). In the device that is disclosed in Japanese Laid-open Patent Publication No. 2006-142779, the consumed current value of each load is measured and, based on the measured consumed current value, a sequence control is performed on the start-up sequence of the power source so that the start-up time becomes shortest, whereby the power-source start-up time, included in the ADF initialization time, is reduced.

However, in the conventional device that is disclosed in Japanese Laid-open Patent Publication No. 2006-142779, before the conveyance of a document sheet is conducted for a new job, a remaining-sheet treatment is performed during the ADF initialization time to discharge a document sheet that remains within the device without being properly discharged outside the device during the previous job.

Therefore, the conventional device has a problem in that the ADF initialization time becomes longer due to the time of the remaining-sheet treatment and the waiting time becomes longer after the main power source is turned on or a return is made from the energy saving mode by the user until when the state (ADF ready) is obtained such that the ADF is actually operable.

The ADF 5 according to the present embodiment solves the above-described conventional problem, and it has an object to shorten the ADF initialization time by separately performing the remaining-sheet treatment after the ADF initialization is completed.

Figure 6:
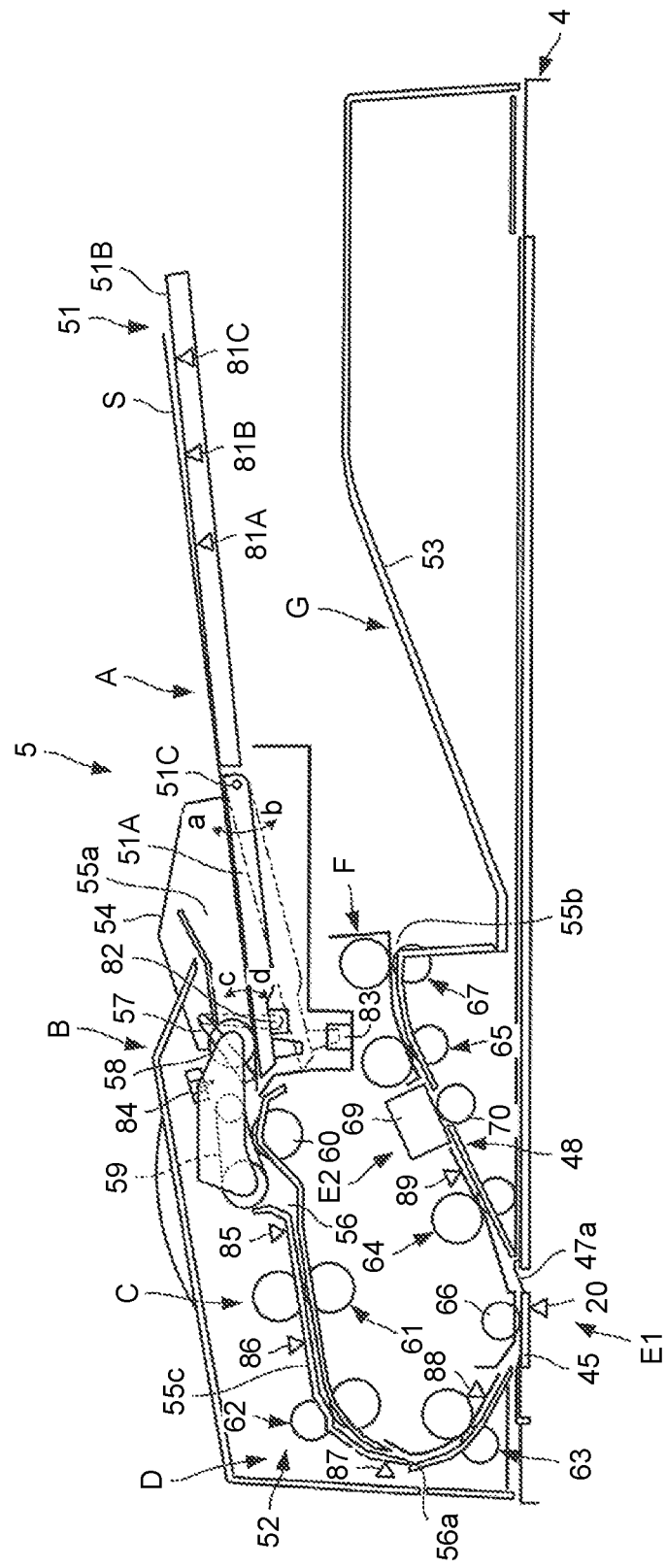
FIG. 6 is a schematic cross-sectional view of the ADF according to a second embodiment of the present invention.

As illustrated in FIG. 6, according to the present embodiment, the document conveying section 52 includes conveyance rollers 62, 64 and a first read roller 66 that is arranged above the first contact glass 45 such that they are opposed to each other, in addition to the configuration according to the first embodiment.

The conveyance roller 62 is a turn roller that delivers the document sheet S, which is drawn and conveyed by the conveyance roller 61, into a turn section 56a in the middle of the document conveyance path 56.

The first read roller 66 is biased toward the first contact glass 45 by using a bias member, such as a coil spring. When the document sheet S is conveyed, the first read roller 66 moves the document sheet S, which is delivered onto the first contact glass 45, to the downstream while the document sheet S is in close contact with the first contact glass 45.

After passing through the first contact glass 45, the document sheet S is conveyed toward a second-surface read section 48, which is described later, by a conveyance roller 64 that is a first read exit roller and is further conveyed toward the sheet ejection opening 55b by the downstream conveyance roller 65, which is a second read exit roller.

Furthermore, in the document conveying section 52, the second-surface read section 48 is provided within a relatively linear document conveyance area that is located downstream of the first read roller 66 and that is located between the conveyance roller 64 and the conveyance roller 65. The second-surface read section 48 scans the image surface on the second side, e.g., the back side, of the document sheet S that has been passed by the first contact glass 45.

As illustrated in FIG. 6, the ADF 5 according to the present embodiment includes, as multiple functional units, the document set section A, the separating/feeding section B, the registration section C, the turn section D, a first reading/conveying section E1, a second reading/conveying section E2, the discharge section F, and the stack section G. The first reading/conveying section E1 corresponds to the reading/conveying section E according to the first embodiment.

The document table 51 is divided into a movable document table 51A and a trailing-edge side document table 51B. The end of the movable document table 51A is tilted downward in accordance with the bundle thickness of the document sheets S around a shaft 51C as a rotation center and, by operating a bottom-plate lifting/lowering motor 105, which is described later, it is rotated in a vertical direction as indicated by an arrow a and an arrow b in FIG. 6.

The movable document table 51A includes a side guide plate 54 that sets the position of the document sheet S, moving toward the document conveying section 52, in the lateral direction that is perpendicular to the sheet feeding direction. The side guide plate 54 is a pair of guide plates that are provided such that they may be close to or apart from each other in the width direction of the movable document table 51A, whereby the width-direction reference positions of the movable document table 51A and the document sheet S are matched.

On the trailing-edge side document table 51B, the same document length sensors 81A to 81C as those in the first embodiment are provided. For example, by using the document length sensors 81A to 81C and a detection sensor that detects the opposing distance of the side guide plate 54 in combination, the size of the document sheet S, placed on the document table 51, may be detected.

A home position sensor 83 is provided under the end of the movable document table 51A. The home position sensor 83 is configured to detect that the movable document table 51A reaches the home position by being rotated downward.

A table rising sensor 84 that is configured to detect the top position of the document bundle on the movable document table 51A is provided upstream of the abutment sensor 85 in the conveying direction of the document sheet S.

The table rising sensor 84 is configured to detect that the pickup roller 58 is pushed upward to the uppermost position by the document sheet S, which is on the top of the document bundle on the movable document table 51A, in accordance with the rising of the movable document table 51A.

When the table rising sensor 84 is turned on, the rising of the movable document table 51A is stopped. If the top position of the document bundle is lowered due to the repetition of sheet feeding so that the table rising sensor 84 is turned off, the controller unit 100 repeats the control so that the movable document table 51A is lifted up and the table rising sensor 84 is turned on again. Thus, the top position of the document bundle is always kept at the level suitable for sheet feeding.

Then, after all the document sheets S, set on the document table 51, are fed, the movable document table 51A is lowered to the home position so that the subsequent document bundle can be set.

The ADF 5 according to the present embodiment includes both a document-table lifting/lowering unit (the bottom-plate lifting/lowering motor 105) and a pickup lifting/lowering unit (the pickup lifting/lowering motor 101). However, it may be appropriate if only any one of them is configured as a unit that separates and presses the pickup roller 58.

In the second reading/conveying section E2, if the document sheet S is a two-side document, the main scanning is conducted on the image on the back surface from left oblique upward in the drawing through the platen glass at the downstream of the main scanning position of the image on the front surface, and the document sheet S is fed in the sub-scanning direction at a predetermined speed.

The second-surface read section 48 in the second reading/conveying section E2 includes a back-surface scanning unit 69 that reads the image on the back surface of the document sheet S, a shading roller (second read roller) 70 that is opposed to the back-surface scanning unit 69 with the document conveyance path 56 interposed therebetween, a conveyance-gap adjusting unit, or the like.

The back-surface scanning unit 69 reads the image on the back surface (second surface) of the document sheet S after the image on the front surface (first surface) of the document sheet S is read by the image capturing unit 44 of the image reading unit 4. An image reading device, which may be used as the back-surface scanning unit 69, is of a reduction optical system type that uses an image sensor, such as a CCD, or a contact-type same-magnification optical system type, in which the line-shaped light source and the image sensor, crossing in the horizontal width direction (the main scanning direction) of the document sheet S, are arranged in parallel.

With any type of image reading device, it is necessary to perform an initialization operation that includes the initial settings of the device during a start-up. For installation in a limited space, such as an ADF, a small-sized contact-type image sensor (hereafter, referred to as the "CIS") is often used to reduce the device height of the ADF. An explanation is given below on the assumption that the back-surface scanning unit 69 is configured as a CIS.

The second read roller 70 prevents the floating of the document sheet S in the back-surface scanning unit 69 and also serves as a reference white section for acquiring shading data in the back-surface scanning unit 69. Furthermore, in a case where the image on the back surface is not to be read, the document sheet S passes by the back-surface scanning unit 69 by doing nothing.

The above-described conveyance-gap adjusting unit is attached to, for example, the bearing that supports the second read roller 70 so as to adjust the gap between the back-surface scanning unit 69 and the second read roller 70. Thus, the focal depth of the back-surface scanning unit 69 may be maintained such that the read image quality is not degraded.

Figure 7:
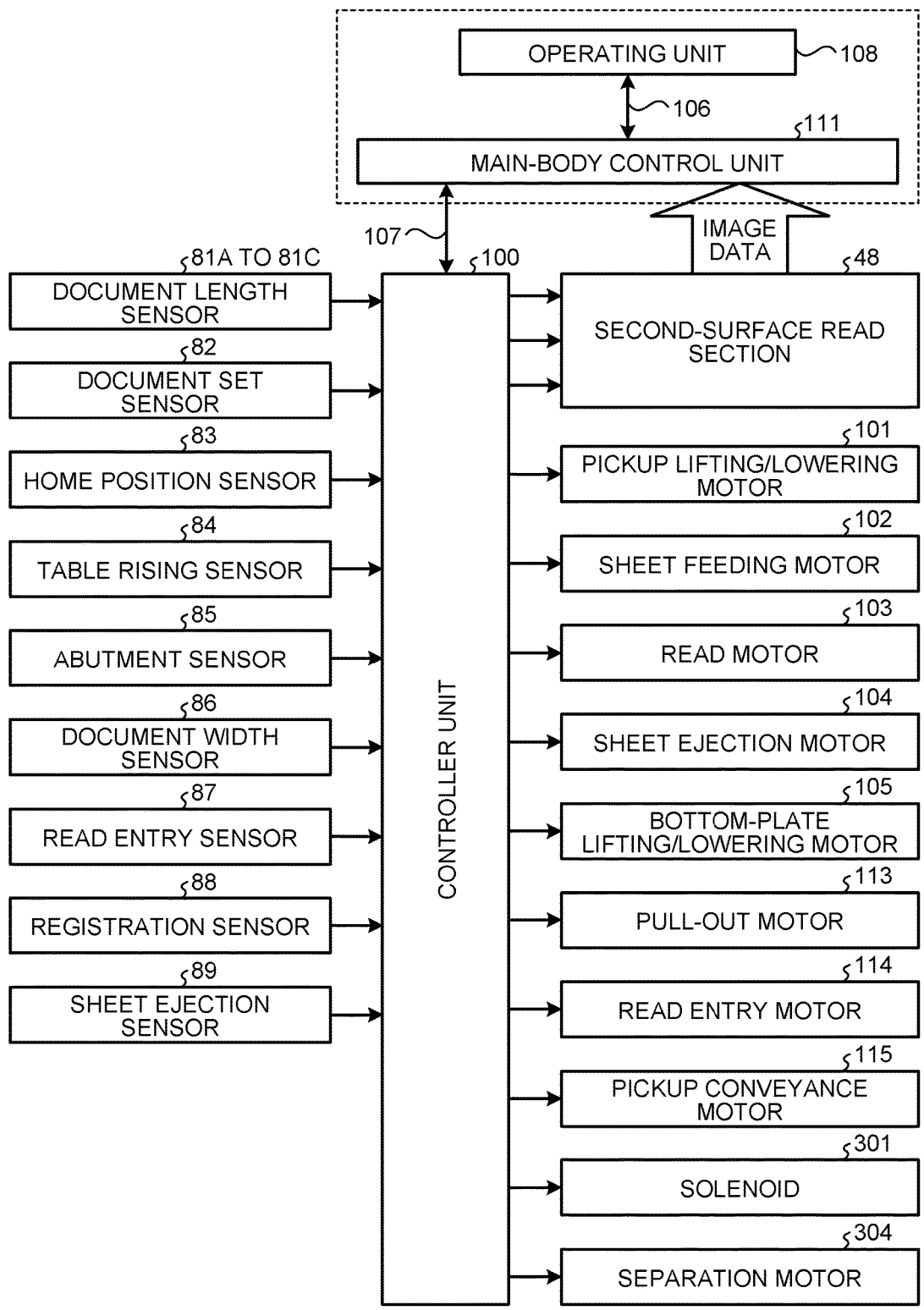
FIG. 7 is a block diagram that illustrates a control configuration of the ADF according to a second embodiment of the present invention.

As illustrated in FIG. 7, the controller unit 100 receives detection signals of the home position sensor 83 and the table rising sensor 84 in addition to the configuration that is illustrated in FIG. 4 according to the first embodiment.

Furthermore, the controller unit 100 operates the second-surface read section 48, the bottom-plate lifting/lowering motor 105, a read entry motor 114, a solenoid 301, and a separation motor 304 in addition to the configuration that is illustrated in FIG. 4 according to the first embodiment.

According to the present embodiment, the read motor 103 drives the conveyance rollers 64, 65. The bottom-plate lifting/lowering motor 105 lifts and lowers the movable document table 51A. The read entry motor 114 rotates the conveyance roller 63 as a read entry roller.

The controller unit 100 transmits the gate signal that indicates the sub-scanning direction valid image area of the second surface to the main-body control unit 111 at the timing when the leading edge of the document sheet S reaches the second-surface read section 48 until the trailing edge of the document sheet S passes through the second-surface read section 48. Here, the above-described timing is detected by using the pulse counts of the read motor 103 after the leading edge of the document sheet S is detected by the sheet ejection sensor 89 that is provided between the conveyance roller 64 and the second-surface read section 48.

Figure 8:
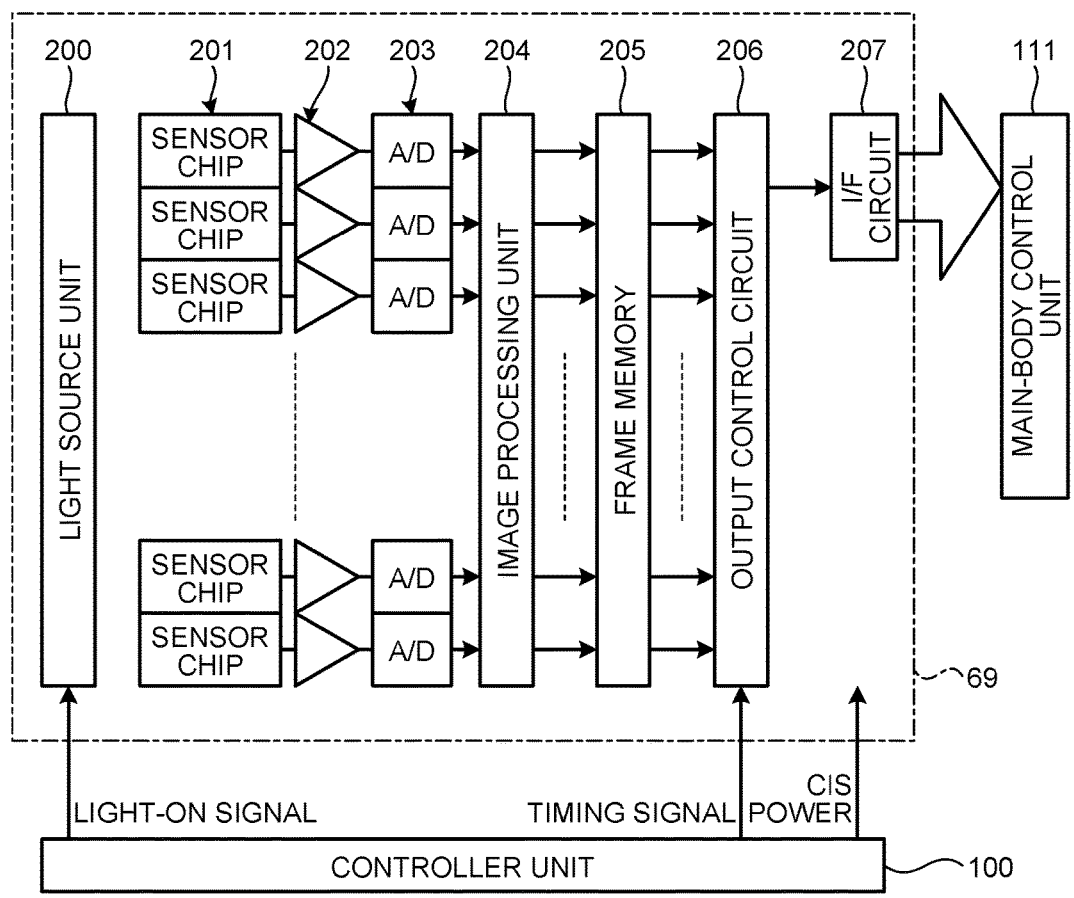
FIG. 8 is a block diagram of a second-surface read section in the ADF according to the second embodiment of the present invention.

As illustrated in FIG. 8, the back-surface scanning unit 69 of the second-surface read section 48 includes a light source unit 200 that includes an LED array, a fluorescent light, a cold-cathode tube, or the like. The power for operating the back-surface scanning unit 69 (hereafter, referred to as the "CIS power") is fed from the controller unit 100.

Before the document sheet S enters the read position of the second-surface read section 48, a light-up signal is transmitted from the controller unit 100 to the light source unit 200. The light source unit 200 lights up in accordance with the light-up signal, whereby the second surface of the document sheet S is irradiated with light.

The back-surface scanning unit 69 includes multiple sensor chips 201 that are arranged in the main scanning direction; multiple operational amplifier circuits 202 that are individually connected to the sensor chips 201; and multiple A/D converters 203 that are individually connected to the operational amplifier circuits 202. Furthermore, the back-surface scanning unit 69 also includes an image processing unit 204, a frame memory 205, an output control circuit 206, an interface circuit 207 (described as the I/F circuit in the drawing), or the like.

The sensor chip 201 includes a photoelectric conversion element and a condenser lens that are referred to as the same-magnification contact image sensor. The reflected light, which is reflected by the second surface of the document sheet S, is focused onto the photoelectric conversion elements by the condenser lenses in the sensor chips 201, whereby it is read as the image information.

The image information, read by each of the sensor chips 201, is amplified by the operational amplifier circuit 202 and is then converted into digital image information by the A/D converter 203.

The digital image information is input to the image processing unit 204, is subjected to shading correction, or the like, and is then temporarily stored in the frame memory 205. Furthermore, after the digital image information is converted by the output control circuit 206 into a data format that is receivable by the main-body control unit 111, it is output to the main-body control unit 111 via the interface circuit 207.

Furthermore, the back-surface scanning unit 69 performs an operation to generate white reference data (shading data) that is the white level for shading correction by using each unit, including the light source unit 200, for the image processing unit 204 to conduct shading correction.

Furthermore, in addition to the shading correction operation that includes the white-reference data generation operation that is performed, the back-surface scanning unit 69 performs various operations as the CIS initialization that includes the initial settings during a start-up. For example, as various operations during the CIS initialization, CIS communication failure detection, CIS initial setting, CIS black-level check, CIS white-level check, CIS light-source failure detection, or the like, are automatically performed.

Here, the above-described CIS communication failure detection is an operation to detect a communication failure between the back-surface scanning unit 69 and an image processing ASIC. The above-described CIS initial setting is an operation to set registers of the back-surface scanning unit 69 and the image processing ASIC, or the like. The above-described CIS black-level check is an operation to adjust the black level of image data such that it becomes a desired output level. The above-described CIS white-level check is an operation to adjust the white level of image data such that it becomes a desired output level. The above-described CIS light-source failure detection is an operation to detect whether the illumination light from the light source unit 200 has desired brightness.

Furthermore, the image forming device 1 according to the present embodiment is designed such that, if the CIS initialization is not completed when the main power source is turned on, the ADF 5 does not enter the ADF ready state, in which automatic document feeding is possible.

A specific explanation is given below of the initialization operation (ADF initialization) of the ADF 5 when the main power source is turned on or when a return is made from the energy saving mode.

Figure 9:
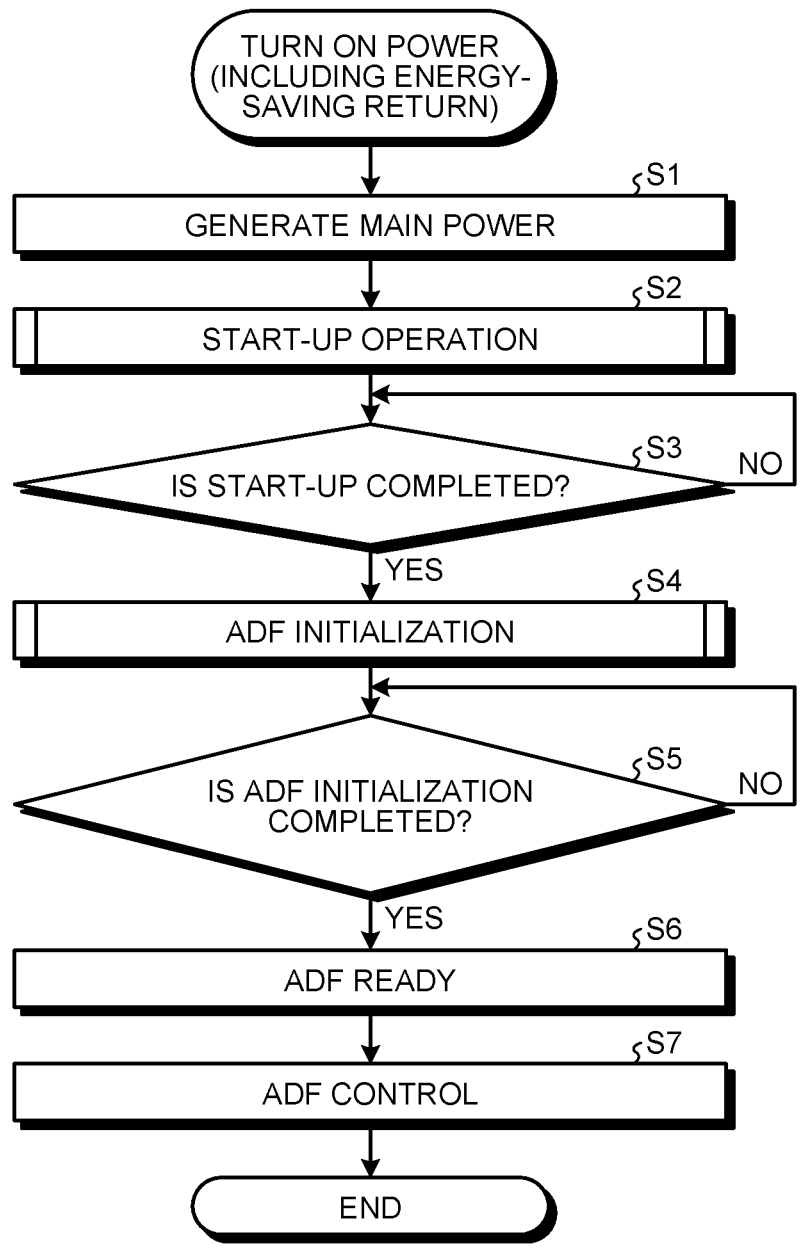
FIG. 9 is a flowchart that illustrates the flow of an operation of an image forming device, including the ADF according to the second embodiment of the present invention, when the main power source is turned on or when a return is made from the energy saving mode.

FIG. 9 is a flowchart that illustrates the flow of a primary operation of the image forming device 1 when the main power source is turned on or when a return is made from the energy saving mode.

Here, while the power source of the image forming device 1 is in an off state, the image forming device 1 makes an energy saving return from the energy saving mode by turning on the main power switch of the image forming device 1 or by placing the document sheet S on the document table 51 by a user, for example.

First, at Step S1, the main-body control unit 111 generates the main power to set the operation mode in which automatic document feeding is possible.

Furthermore, the operation mode includes, for example, an automatic feeding mode (ADF mode) or a pressure-plate mode. The automatic feeding mode is a sheet-through type operation mode in which the first-surface reading unit 40 is fixed and, while the document sheet S, which is the target to be read, is conveyed at a predetermined speed, an image is read by either or both of the first-surface reading unit 40 and the second-surface read section 48. Furthermore, the pressure-plate mode is a document-fixed reading type operation mode, in which the document sheet S, the target to be read, is fixed and, while the first-surface reading unit 40 is moved, an image is read. Furthermore, the operation mode includes, for example, reading conditions, such as a one-sided reading mode or a two-side reading mode of the document sheet S.

Furthermore, after the main power is generated, the main-body control unit 111 performs a start-up operation to set an operation mode at Step S2. During the start-up operation, for example, each of the sheet feeding device 2, the image forming unit 3, and the image reading unit 4 of the image forming device 1 performs the initialization operation (the initialization operation of the first-surface reading unit 40) that includes initial settings. Furthermore, the main-body control unit 111 performs, as the start-up operation, the operation to set an ADF power flag and a CIS power flag on, which are described later. On/off of the ADF power flag and the CIS power flag is controlled by the main-body control unit 111.

Next, at Step S3, the main-body control unit 111 determines whether the start-up operation to set the operation mode is completed. If it is determined that the start-up operation is completed (yes at Step S3), the main-body control unit 111 performs ADF initialization (see FIG. 10), which is described later, via the controller unit 100 at Step S4.

Conversely, if it is not determined that the start-up operation is completed (no at Step S3), a determination operation is continued at Step S3 until the start-up operation is completed.

Next, at Step S5, the main-body control unit 111 determines whether the ADF initialization is completed. Furthermore, if it is not determined that the ADF initialization is completed (no at Step S5), a determination operation is continued at Step S5 until the ADF initialization is completed.

Conversely, if the main-body control unit 111 determines that the ADF initialization is completed (yes at Step S5), the ADF 5 enters the ADF ready state at Step S6. Furthermore, the main-body control unit 111 performs the ADF control (see FIG. 12), which is described later, via the controller unit 100 at Step S7.

Furthermore, the ADF control is performed so that the above-described sequence of operations when the main power source is turned on or when a return is made from the energy saving mode are completed, whereby the image forming device 1 enters a state such that automatic document feeding is always possible in the above-described operation mode.

Figure 10:
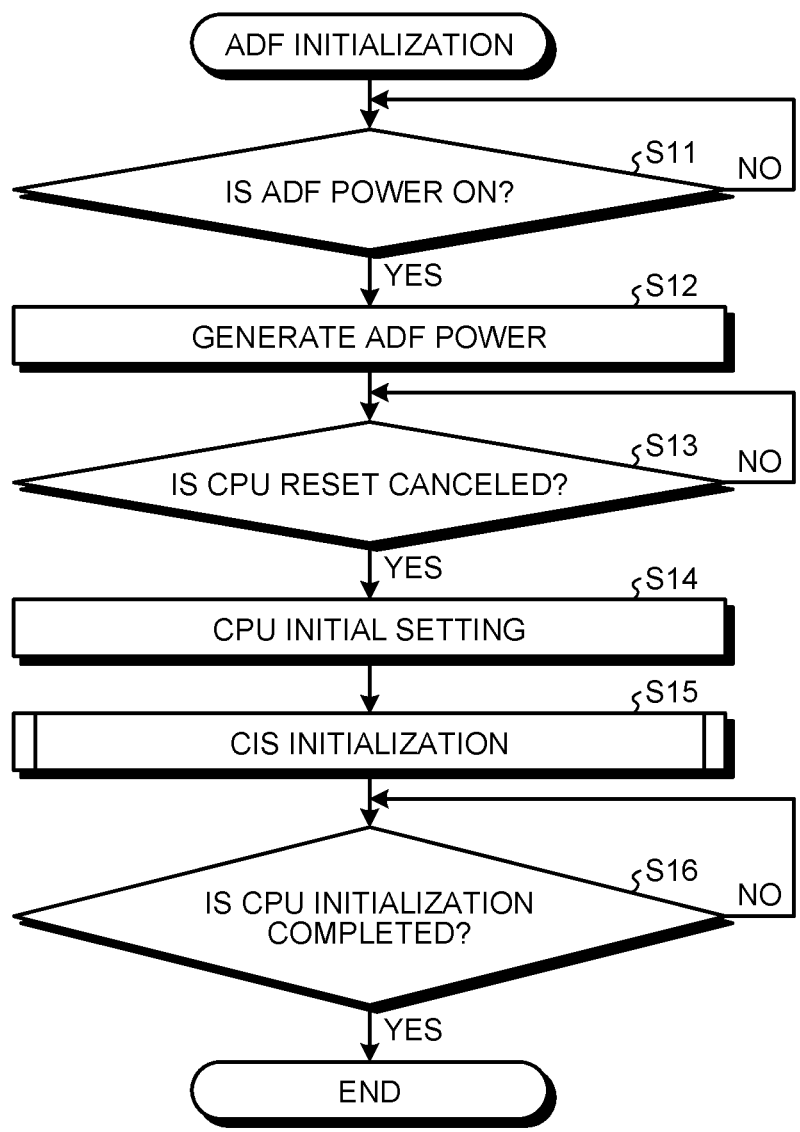
FIG. 10 is a flowchart that illustrates the flow of an operation during ADF initialization of the image forming device, including the ADF according to the second embodiment of the present invention.

FIG. 10 is a flowchart that illustrates the flow of a primary operation (turning on of the ADF power source) of the ADF initialization, performed at the above-described Step S4.

First, at Step S11, the main-body control unit 111 determines whether the ADF power flag is on. Here, the on state of the ADF power flag indicates that the main power source has been turned on or the return has been made from the energy saving mode.

If it is determined that the ADF power flag is on (yes at Step S11), the main-body control unit 111 generates the ADF power to set the operation mode of the ADF 5, in which automatic document feeding is possible, at Step S12.

Conversely, if it is not determined that the ADF power flag is on at the above-described Step S11 (no), the determination operation is continued at Step S11 until the ADF power flag is on.

After generation of the ADF power is completed, the main-body control unit 111 determines whether the CPU reset operation to make the initial settings of the controller unit 100 of the ADF 5 is in a canceled state at Step S13. If it is not determined that the CPU reset operation is in a canceled state (no), the determination operation is continued at Step S13 until the CPU reset operation is canceled.

Conversely, if it is determined that the CPU reset operation is in a canceled state (yes at Step S13), the main-body control unit 111 performs a CPU initial-setting operation to make the initial settings of the controller unit 100 at Step S14.

Next, at Step S15, the main-body control unit 111 performs the CIS initialization (see FIG. 11), which is described later, via the controller unit 100.

Next, at Step S16, the main-body control unit 111 determines whether the CIS initialization is completed via the controller unit 100. Furthermore, if it is not determined that the CIS initialization is completed (no), the determination operation is continued at Step S16 until the CIS initialization is completed.

Furthermore, as the CIS initialization is performed (yes at Step S16), the above-described ADF initialization is completed, and the state (ADF ready) is obtained such that the automatic feeding operation the document sheet S is possible by the ADF 5.

Specifically, when the main power source is turned on or when a return is made from the energy saving mode, the ADF 5 enters the ADF ready state (see FIG. 14A) not until the CIS initialization, which is continuously conducted after the ADF power source is started up, is completed as the ADF initialization.

FIG. 11 is a flowchart that illustrates the flow of a primary operation of the CIS initialization, performed at the above-described Step S15.

First, at Step S21, the controller unit 100 of the ADF 5 determines whether the CIS power flag is on. Here, the on state of the CIS power flag indicates that the main power source has been turned on or the return has been made from the energy saving mode.

At the above-described Step S21, if it is not determined that the CIS power flag is on (no), the determination operation is continued at Step S21 until the CIS power flag is on.

Conversely, if it is determined that the CIS power flag is on (yes at Step S21), the controller unit 100 generates the CIS power for setting the second-surface read section 48 in a state such that the image on the back surface of the document sheet S can be read at Step S22.

Next, after generation of the CIS power is completed, the controller unit 100 determines whether the CIS power is stable at Step S23. The determination operation is continued at Step S23 until the CIS power becomes stable (no→yes).

Conversely, if it is determined that the CIS power is stable at the above-described Step S23 (yes), the controller unit 100 causes the second-surface read section 48 to perform various operations that include the initial settings.

Specifically, the second-surface read section 48 performs an operation to detect a CIS communication failure at Step S24 and then performs a CIS initial-setting operation at Step S25. Furthermore, after performing the CIS initial-setting operation, the second-surface read section 48 performs an operation to check the CIS black level at Step S26. Furthermore, after performing the operation to check the CIS black level, the second-surface read section 48 performs an operation to check the CIS white level at Step S27. Furthermore, after performing the operation to check the CIS white level, the second-surface read section 48 performs an operation to detect a CIS light-source failure at Step S28.

Then, after performing the operation to detect a CIS light-source failure by the second-surface read section 48, the controller unit 100 terminates the above-described CIS initialization. Thus, the ADF 5 enters the state where a two-side read mode can be set to read images on the two sides, including reading on the image on the back side, in accordance with an automatic feeding operation of the document sheet S. Afterward, the operation proceeds to the above-described Step S16.

FIG. 12 is a flowchart that illustrates the flow of a primary operation of the ADF control, performed at the above-described Step S7.

First, at Step S31, the user sets the operation mode that includes a reading condition, such as designation of a two-side read mode or a one-side read mode of the document sheet S, via the operating unit 108. Here, for example, the same read mode may be set for all the document sheets S that are set on the document table 51. Alternatively, a different read mode may be set for each of the document sheets S (for example, out of the ten document sheets in total, a two-side read mode for the first and the tenth sheets, and a one-side read mode for the others).

Then, the controller unit 100 of the ADF 5 performs the remaining-sheet treatment, which is described later (Step S32). The remaining-sheet treatment is performed before a sheet feeding control (Step S34) is started for the first conveyed document sheet S for the job that is initially executed after the power source of the ADF 5 is turned on.

Next, at Step S33, the controller unit 100 determines whether the remaining-sheet treatment is completed. Furthermore, if it is not determined that the remaining-sheet treatment is completed (no), the determination operation is continued at Step S33 until the remaining-sheet treatment is completed.

Conversely, at the above-described Step S33, if it is determined that the remaining-sheet treatment is completed (yes), the controller unit 100 performs controls at Steps S34 to S37 in accordance with an operation on the start button of the operating unit 108 by the user. Sheet feeding control (Step S34), conveyance control (Step S35), reading control (Step S36), and sheet ejection control (Step S37) at the above-described Steps S34 to S37 are performed in accordance with the operation mode that is set at the above-described Step S31.

Specifically, if the document sheet S, set on the document table 51, is a one-side document, the document sheet S is delivered individually from the document table 51 in accordance with the sheet feeding control at the above-described Step S34. The document sheet S, delivered from the document table 51, is conveyed through the document conveying section 52 and is delivered to the read position 20 in accordance with the conveyance control at the above-described Step S35. Then, when the document sheet S passes through the read position 20, the image on the front surface is read by the image capturing unit 44 of the image reading unit 4 in accordance with the reading control at the above-described Step S36. After the image on the front surface is read, the document sheet S is ejected onto the document ejection tray 53 in accordance with the sheet ejection control at the above-described Step S37.

Conversely, if the document sheet S, set on the document table 51, is a two-side document, the same operation as that for a one-side document is performed until the above-described Steps S34 and S35. When the document sheet S is delivered to the read position 20 and is passed through the read position 20, the image on the front surface is read by the image capturing unit 44 of the image reading unit 4 in accordance with the reading control at the above-described Step S36. After the image on the front surface is read, the document sheet S is further conveyed to the second-surface read section 48 so that the image on the back surface is read by the second-surface read section 48. Thus, after the image on the front surface and the image on the back surface are read during the single feeding operation, the document sheet S is ejected onto the document ejection tray 53 in accordance with the sheet ejection control at the above-described Step S37.

In the same manner, the above-described sequence of actions is repeated for all the document sheets S that are set on the document table 51 (no at Step S38). Then, ejection of the final document sheet S, which is located at the lowermost position on the document table 51, is completed (yes at Step S38), whereby the ADF control at the above-described Step S7 is terminated.

Figure 14A:
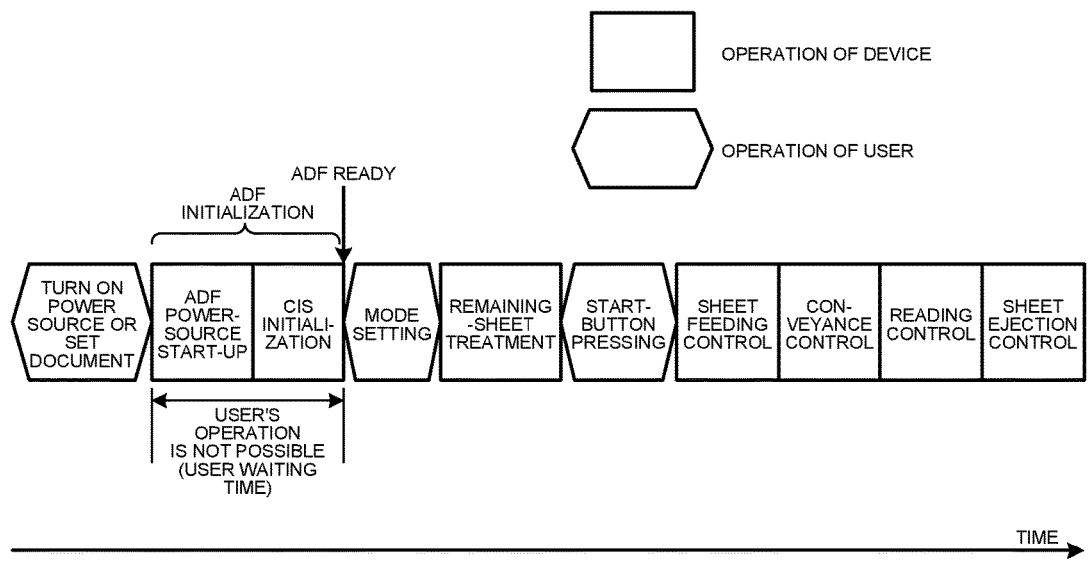
FIGS. 14A and 14B are diagrams that illustrate the ADF initialization time in the image forming device, including the ADF according to the second embodiment of the present invention, when the main power source is turned on or when a return is made from the energy saving mode.

As described above, in conventional ADFs, the remaining-sheet treatment is performed during the ADF initialization. Conversely, according to the present embodiment, as illustrated in FIG. 14A, the remaining-sheet treatment, which has a large proportion of the conventional ADF initialization time, is eliminated from the ADF initialization operation.

Therefore, compared to the conventional operation in which the remaining-sheet treatment is performed during the ADF initialization, the ADF initialization time (the time from when the ADF power source is started up to when the ADF is ready) is shortened during the operation according to the present embodiment. Thus, the user may make settings (hereafter, also referred to as "mode setting") of the operation mode promptly after the main power source is turned on or a return is made from the energy saving mode. Furthermore, the timing at which the remaining-sheet treatment is performed may be right after the "mode setting".

However, during the operation in FIG. 12, the start of "sheet feeding control" is delayed from "the mode setting" until "the remaining-sheet treatment" is completed.

Figure 14B:
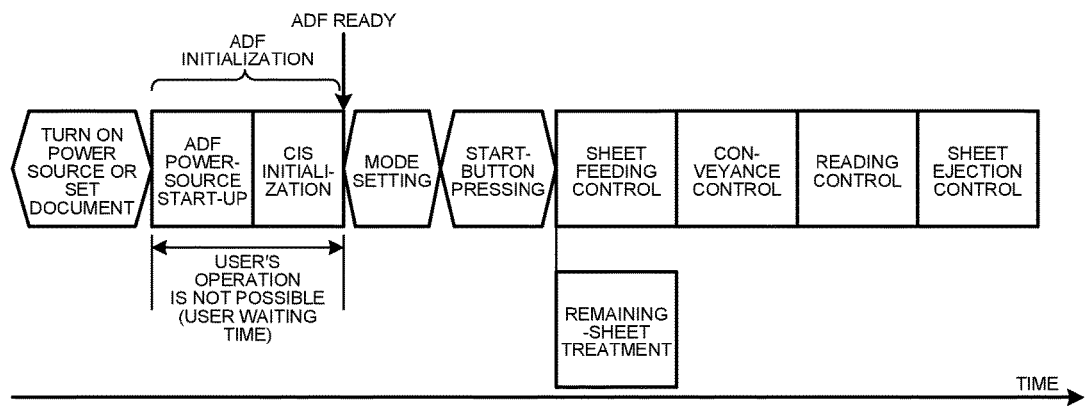

Therefore, as illustrated in the flowchart of FIG. 13, the sheet feeding control (Step S42) and the remaining-sheet treatment (Step S44) are performed in parallel, whereby the delay time due to the remaining-sheet treatment may be reduced, as illustrated in FIG. 14B. Especially, with regard to the first job that is executed after the power source of the ADF 5 is turned on, if a remaining-sheet processing time T2 is shorter than a registration reach time T1 from when feeding of the first conveyed document sheet S is started to when it reaches a registration position, the delay time due to the remaining-sheet treatment does not occur. Here, the details of each operation in FIG. 13 are the same as the operation in FIG. 12; thus, their explanations are omitted.

A specific explanation is given below of the remaining-sheet treatment that is performed by the controller unit 100 of the ADF 5. As illustrated in FIG. 6, the sheet ejection sensor 89, which is a sensor most downstream in the conveying direction, is located upstream of the sheet ejection roller 67, which is a most downstream roller. This is because the document sheet S is dropped onto the document ejection tray 53 without fail and the stacking performance is improved.

However, there is a possibility that, during conveyance, the document sheet S cannot be conveyed for a predetermined distance due to slipping of the document sheet S, step-out of the motor, or the like, and the trailing edge of the document sheet S remains between the sheet ejection sensor 89 and the sheet ejection roller 67. Hereafter, the above-described document sheet, which remains within the document conveyance path 56, is also referred to as the "remaining sheet".

At this point, as the trailing edge of the remaining sheet passes through the most downstream sheet ejection sensor 89, the sheet ejection sensor 89 cannot detect the remaining sheet, and the remaining sheet is continuously nipped by the roller that is located downstream of the sheet ejection sensor 89. Especially, in a case of a small-sized document, there is a possibility that the user does not notice the remaining sheet and forgets to remove it. However, if a configuration is such that a sensor is provided downstream of the sheet ejection roller 67 to detect whether sheet ejection is completed, it is possible to prevent the remaining sheet; however, costs are increased.

Therefore, the ADF 5 according to the present embodiment rotates the roller, with which there is a possibility that the above-described remaining sheet is nipped, thereby discharging the remaining sheet out of the device without fail.

Typically, a sensor is often located between the rollers that are driven by different driving sources. This is because it is easier to determine the delivering timing of a document sheet to each roller and to control the driving control.

Figure 15A:
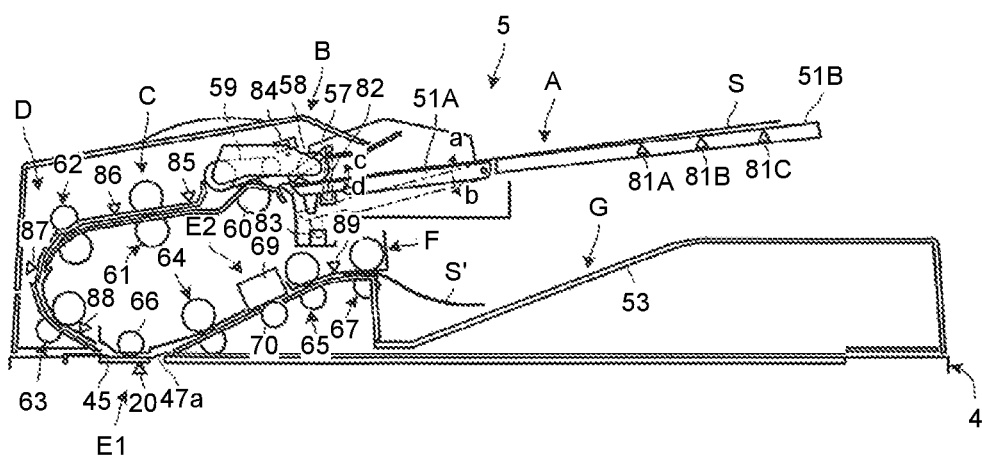
FIGS. 15A and 15B are schematic cross-sectional views of the ADF according to the second embodiment of the present invention, and they illustrate a state where there is a remaining sheet on a document conveyance path.

As in FIG. 15A, if the sheet ejection sensor 89 is provided between the conveyance roller 65 (the read motor 103 is a driving source) and the sheet ejection roller 67 (the sheet ejection motor 104 is a driving source), the driving source (the sheet ejection motor 104) of the roller, with which the remaining sheet is nipped, is single.

In this way, in a case where the number of driving sources of rollers, provided downstream of the sensor that is located most downstream, is one, if the remaining-sheet treatment is not performed during the start-up of the ADF 5, the remaining sheet is discharged as the preceding sheet during the subsequent document feeding operation without problem. However, to make the user notice the presence of the remaining sheet, it is preferable to perform the remaining-sheet treatment.

Figure 15B:
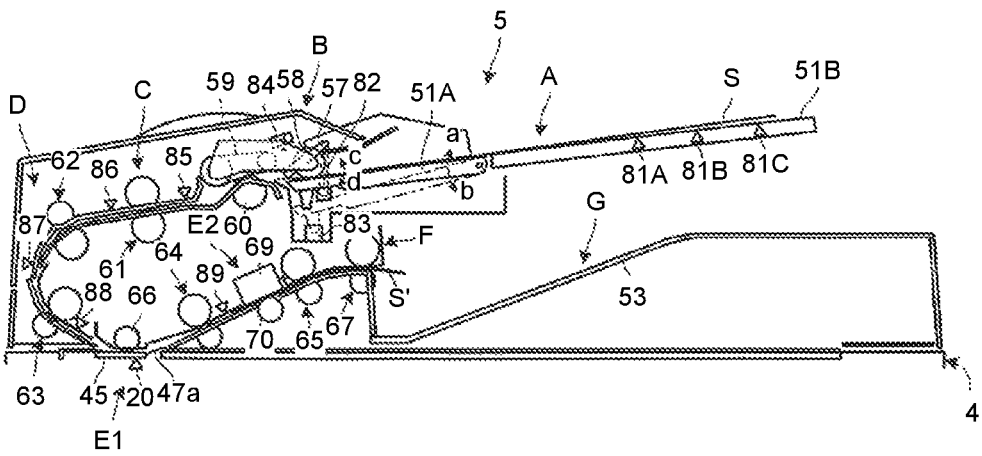

Conversely, as illustrated in FIG. 6 and FIG. 15B, there is a configuration such that the position of the sheet ejection sensor 89 is located before the back-surface scanning unit 69. With this configuration, the detection information from the sheet ejection sensor 89 is used as not only a control reference of the sheet ejection motor 104, but also a reference for the back-surface read timing by the back-surface scanning unit 69, whereby a reduction in costs is achieved.

However, in the case of the above configuration, as illustrated in FIG. 15B, there is a possibility that the remaining sheet is nipped between two rollers (the conveyance roller 65 and the sheet ejection roller 67) whose driving sources are the read motor 103 and the sheet ejection motor 104, respectively.

Furthermore, the drive start timing of the read motor 103 is earlier than that of the sheet ejection motor 104. Therefore, if a document sheet for a new job is started to be conveyed while the remaining sheet is present without performing the remaining-sheet treatment, the conveyance roller 65 is rotated while the remaining sheet is pressed by the sheet ejection roller 67; thus, the remaining sheet is bent. Therefore, if the remaining sheet is nipped by multiple rollers that are driven by multiple driving sources, the remaining-sheet treatment is necessary.

During the remaining-sheet treatment, in a case where the length of the remaining sheet is longest in the document conveyance path 56, the remaining sheet remains while it almost passes through the sheet ejection sensor 89, which is the most downstream sensor, as in FIGS. 15A and 15B.

In order to discharge the above-described remaining sheet S' without fail, the remaining sheet S' needs to be conveyed for a distance that is equal to or greater than "the distance from the sheet ejection sensor 89 to the sheet ejection roller 67" by the driving sources of the rollers that nip the remaining sheet S' on the downstream of the sheet ejection sensor 89.

Here, if "the distance from the sheet ejection sensor 89 to the sheet ejection roller 67" is L1, to make the remaining-sheet processing time T2 shorter than the registration reach time T1, the conveying speed of the remaining sheet S' during the remaining-sheet treatment may be equal to or greater than V1=L1/T1.

Furthermore, as in FIG. 15B, if the remaining sheet is nipped by the conveyance roller 65 and the sheet ejection roller 67, it is preferable that the conveying speeds of the conveyance roller 65 and the sheet ejection roller 67, driven by the read motor 103 and the sheet ejection motor 104, are the same. Thus, it is possible to prevent the remaining sheet from being bent.

Furthermore, as described above, in the case of the configuration of FIG. 15A, where the driving source of the roller, with which the remaining sheet is nipped, is only one, the remaining sheet is properly discharged as the preceding sheet without being bent in accordance with the control after Step S34 or S42; thus, the remaining-sheet treatment does not need to be performed.

Figure 16:
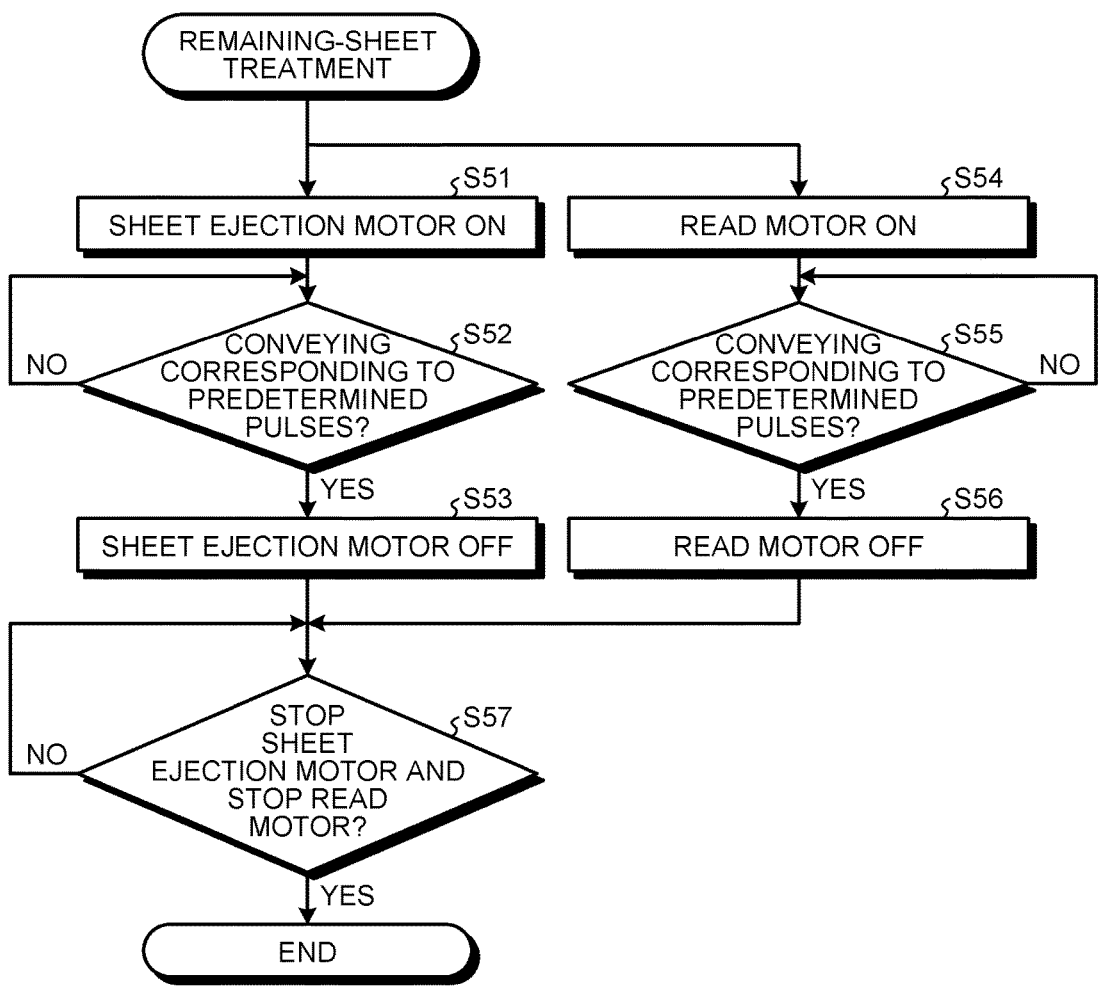
FIG. 16 is a flowchart that illustrates the flow of a remaining-sheet treatment by the ADF according to the second embodiment of the present invention.

FIG. 16 is a flowchart that illustrates the flow of a primary operation during the remaining-sheet treatment, performed at the above-described Step S32 or S44. Here, an explanation is given of, for example, a state where the remaining sheet S' is nipped by multiple rollers (e.g., the conveyance roller 65 and the sheet ejection roller 67) that are provided downstream of the most downstream sensor 89, as in FIG. 15B. Furthermore, the operations at Steps S51 to S53 and the operations at Steps S54 to S56 are simultaneously performed in synchronized timing with each other.

First, at Steps S51 and S54, the controller unit 100 simultaneously drives the sheet ejection motor 104 and the read motor 103 for normal rotation so that the sheet ejection roller 67 and the conveyance roller 65 are rotated in the conveying direction. At this time, the conveying distance of the remaining sheet S' by the conveyance roller 65 and the sheet ejection roller 67, which are provided on the downstream of the sheet ejection sensor 89, which is the most downstream sensor, is equal to or greater than a distance L1 from the sheet ejection roller 67 to the sheet ejection sensor 89.

Furthermore, the pulse number and the pulse speed that satisfy the desired conveying distance L1 and the conveying speed V1 are previously set for each of the sheet ejection motor 104 and the read motor 103, and each motor is driven with the set pulse speed.

Next, at Step S52, the controller unit 100 determines whether the pulse count after the sheet ejection motor 104 is driven reaches the above-described pulse number. If it is determined that the pulse count reaches the above-described pulse number (yes at Step S52), the controller unit 100 stops the sheet ejection motor 104 at Step S53.

Conversely, if the pulse count does not reach the predetermined pulse number (no at Step S52), the determination operation is continued at Step S52 until the pulse count reaches the predetermined pulse number.

Furthermore, at Step S52 and Step S55 simultaneously, the controller unit 100 determines whether the pulse count after the read motor 103 is driven reaches the above-described pulse number. If it is determined that the pulse count reaches the above-described pulse number (yes at Step S55), the controller unit 100 stops the read motor 103 at Step S56.

Conversely, if the pulse count does not reach the predetermined pulse number (no at Step S55), the determination operation is continued at Step S55 until the pulse count reaches the predetermined pulse number.

Next, at Step S57, the controller unit 100 determines whether the sheet ejection motor 104 and the read motor 103 are stopped. Furthermore, if it is not determined that the sheet ejection motor 104 and the read motor 103 are stopped (no), the determination operation is continued at Step S57 until the sheet ejection motor 104 and the read motor 103 are stopped.

Then, the sheet ejection motor 104 and the read motor 103 are stopped (yes at Step S57), and then the remaining-sheet treatment is terminated.

As described above, in the ADF 5 according to the present embodiment, the controller unit 100 does not perform at least part of the initialization operation if a predetermined time does not elapse after the power source of the ADF 5 is turned on. Here, the predetermined time is the time after when the power source of the ADF 5 is turned on to when the ADF initialization operation at Step S4 is completed. Specifically, the ADF initialization according to the present embodiment does not include the remaining-sheet treatment, which is performed during the conventional ADF initialization, and the remaining-sheet treatment is separately performed after the ADF initialization is completed.

In this manner, the ADF initialization time may be shortened; thus, it is possible to reduce the waiting time from when the main power source is turned on or a return is made from the energy saving mode by the user to when the operating unit becomes operable. Furthermore, as the user is capable of making the mode setting promptly after the ADF 5 is started up, whereby it is possible to reduce the user's feeling of stress of the waiting time.

Furthermore, the controller unit 100 performs the remaining-sheet treatment, in which the roller, provided downstream of the sensor that is located most downstream, is rotated in the conveying direction of the document sheet S, after a predetermined time elapses. Thus, during the ADF initialization operation, motor driving sounds do not occur due to the remaining-sheet treatment.

Furthermore, the controller unit 100 completes the remaining-sheet treatment before the leading edge of the first conveyed document sheet S reaches the read position 20 with regard to the first job that is executed after the power source of the ADF 5 is turned on. Thus, without waiting the completion of the remaining-sheet treatment, the document sheet S for the new job may start to be conveyed. Furthermore, as paper conveyance sound (the sound of friction between the conveyed document sheet S and the guide of the document conveyance path 56) during the sheet feeding control is such a level that the sound of the remaining-sheet treatment is sufficiently canceled; therefore, if the remaining-sheet treatment and the sheet feeding control are performed in parallel, unpleasant noise due to the sound of the remaining-sheet treatment may be reduced.

Furthermore, during the remaining-sheet treatment, the controller unit 100 performs control such that all the rollers, provided downstream of the sensor that is located most downstream, are operated at the same conveying speed. Thus, it is possible to prevent the remaining sheet from being bent.

Furthermore, during the remaining-sheet treatment, the controller unit 100 performs control such that the conveying distance of the roller, provided downstream of the sensor that is located most downstream, is equal to or greater than the distance from the sensor provided most downstream to the roller provided most downstream. Thus, if there is a remaining sheet within the document conveyance path 56, the remaining sheet may be discharged without fail.

Furthermore, the controller unit 100 does not perform the remaining-sheet treatment if the number of driving sources of the rollers, provided downstream of the sensor that is located most downstream, is one. Thus, it is possible to eliminate the remaining-sheet processing time and the noise that occurs during the remaining-sheet treatment.

Third Embodiment

Next, with reference to the drawings, an explanation is given of an automatic document feeder according to a third embodiment of the present invention. Here, the explanations for the same configuration and operation as those in the first and the second embodiments are omitted as appropriate.

In recent years, in order to prevent the remainder of the trailing edge of the discharged document or to improve the alignment performance, there have been disclosed devices, in which the final discharge speed for long documents is faster than that for short documents, or the final discharge speed for thin sheet documents is faster than that for thick sheet documents (for example, see Japanese Laid-open Patent Publication No. 11-060053).

Furthermore, there is a disclosed sheet processing device, in which a sheet processing unit is prevented from performing an initialization operation when the operation power of the device is turned on and a storage unit stores the initialized state of the sheet processing unit (see, for example, Japanese Laid-open Patent Publication No. 2013-088704). The device, disclosed in Japanese Laid-open Patent Publication No. 2013-088704, is intended for improvement in the delay of the start of a processing operation, an increase in the power consumption, an increase in noise, a reduction in the durable life of each processing unit, or the like, due to the initialization operation after the power source is turned on.

However, the conventional devices, as disclosed in Japanese Laid-open Patent Publication No. 11-060053 and Japanese Laid-open Patent Publication No. 2013-088704, have a problem in that, as the discharged sheets, i.e., the remaining sheet for the previous job and the document sheet for the new job, are stacked in an overlapped manner, the user is unlikely to notice the presence of the remaining sheet.

With reference to FIG. 6, a specific explanation is given below of the problem of conventional ADFs. The ADF 5 according to the present embodiment includes the overall configuration that is illustrated in FIG. 6. As described in the second embodiment, in conventional ADFs, the remaining-sheet treatment is performed as the initialization operation of the ADF when the main power source of the image forming device 1 is turned on or when a return is made from the energy saving mode.

However, as it is a rare case where the remaining sheet is located in the position as illustrated in FIGS. 15A and 15B according to the second embodiment, it is not effective to perform the remaining-sheet treatment each time the main power source is turned on or a return is made from the energy saving mode.

Furthermore, there are disadvantages such that the subsequent job cannot be started each time until the initialization operation is completed or unpleasant noise occurs during the initialization operation; therefore, there are possible product design concepts, under which the initialization operation is not performed.

However, in such a case, it is necessary to start the actions of the read motor 103 and the sheet ejection motor 104 in such a timing that the first document sheet for the new job, after the main power source is turned on or a return is made from the energy saving mode, does not catch up with the remaining sheet, whereby the remaining sheet for the previous different job is discharged.

However, in that case, there is a problem in that the remaining sheet for the different job is mixed with the first and subsequent document sheets for the subsequent new job on the document ejection tray 53 and difficulty arises in discriminating them.

The ADF 5 according to the present embodiment is intended for solving the above-described conventional problem to make the user easily notice the presence of the remaining sheet for the previous job.

Figure 17A:
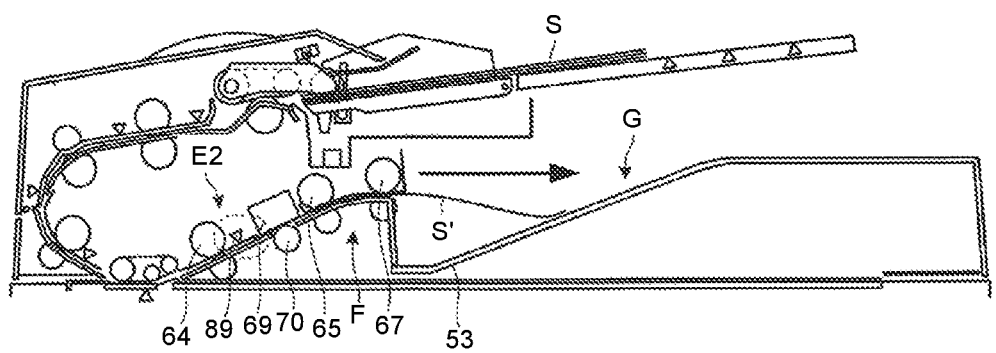
FIGS. 17A and 17B are schematic cross-sectional views of the ADF according to a third embodiment of the present invention, and they illustrate an example of the remaining-sheet treatment in a case where there is a remaining sheet on the document conveyance path.
Figure 17B:
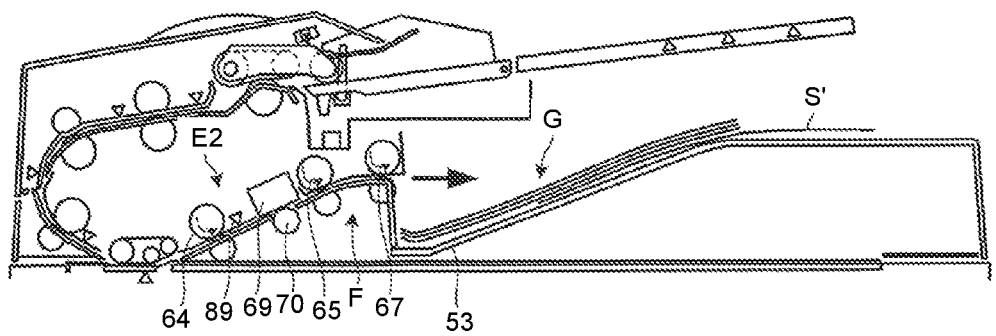

With reference to FIG. 13 and FIGS. 17A and 17B, an explanation is given below of an example of the configuration and the operation of the ADF 5 according to the present embodiment.

FIG. 17A illustrates a state where the document sheet S is set on the document table 51 for the first job after the main power source is turned on or a return is made from the energy saving mode and the remaining sheet S' for the previous different job remains within the document conveyance path 56. At this point, the trailing edge of the remaining sheet S' with respect to the conveying direction is located on the downstream of the sheet ejection sensor 89.

During the remaining-sheet treatment (Step S44) in the flowchart of FIG. 13, the ADF 5 causes the most downstream sheet ejection roller 67 and the second most downstream conveyance roller 65, to operate for conveyance at a higher speed than the conveying speed during the normal sheet ejection control (Step S47). At this point, the ADF 5 performs the sheet feeding control (Step S42) on the first document sheet S in parallel.

Thus, the remaining sheet S', which remains within the document conveyance path 56 during the previous different job, is discharged at a higher speed and, as illustrated in FIG. 17B, it is protruded from the stack position of the normal document sheets S in the stack section G.

Afterward, the document sheet, which is conveyed after the first document sheet S for the first job, is stacked on the normal stack position in accordance with the normal sheet ejection control so that the remaining sheet S' for the different job, stacked by being projected, may be easily noticed by the user.

Furthermore, as illustrated in FIG. 15A according to the second embodiment, if the single roller is provided downstream of the sheet ejection sensor 89, only the sheet ejection roller 67, which is the most downstream roller, may be operated for conveyance at a higher speed than the conveying speed during the normal sheet ejection control (Step S47).

Figure 18A:
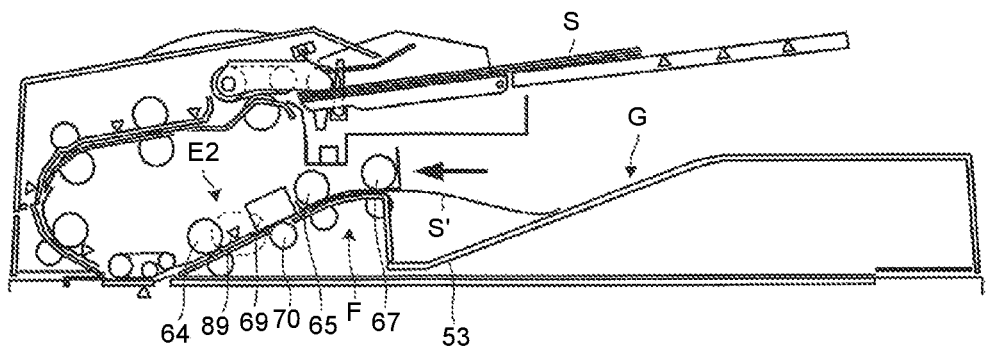
FIGS. 18A and 18B are schematic cross-sectional views of the ADF according to the third embodiment of the present invention, and they illustrate another example of the remaining-sheet treatment in a case where there is a remaining sheet on the document conveyance path.
Figure 18B:
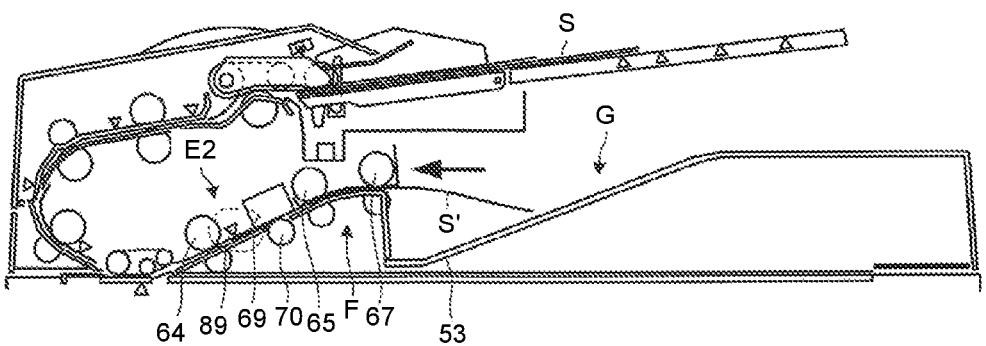

An explanation is given, with reference to FIG. 13 and FIGS. 18A and 18B, another example of the configuration and the operation of the ADF 5 according to the present embodiment.

FIG. 18A illustrates a state where the document sheet S is set on the document table 51 for the first job after the main power source is turned on or a return is made from the energy saving mode and the remaining sheet S' for the previous different job remains within the document conveyance path 56. At this point, the trailing edge of the remaining sheet S' with respect to the conveying direction is located on the downstream of the sheet ejection sensor 89.

During the remaining-sheet treatment (Step S44) in the flowchart of FIG. 13, the ADF 5 causes the most downstream sheet ejection roller 67 and the second most downstream conveyance roller 65, to operate for conveyance in the direction opposite to the conveying direction during the normal sheet ejection control (Step S47). At this time, the conveying distance of the remaining sheet S' due to the conveyance roller 65 and the sheet ejection roller 67 is equal to or greater than the distance L1 from the sheet ejection roller 67 to the sheet ejection sensor 89. Thus, it is ensured that the trailing edge of the remaining sheet S' reaches the position where it is detected by the sheet ejection sensor 89.

In this way, the state where the remaining sheet S' is not detected by the sheet ejection sensor 89 as in FIG. 18A is changed to the state where it is detected as in FIG. 18B, whereby paper jam detection of the remaining sheet S' is made so that the presence of the remaining sheet S' may be noticed by the user.

Furthermore, as illustrated in FIG. 15A according to the second embodiment, if the single roller is provided downstream of the sheet ejection sensor 89, only the sheet ejection roller 67, which is the most downstream roller, may be operated for conveyance in the direction opposite to the conveying direction during the normal sheet ejection control (Step S47).

As described above, in the ADF 5 according to the present embodiment, the controller unit 100 operates the roller, which is provided most downstream in the conveying direction of the document sheet S, at a higher speed than the conveying speed during the conveying operation for the first job that is executed after the power source of the ADF 5 is turned on. Thus, if there is the remaining sheet for the previous different job within the document conveyance path 56, the remaining sheet is stacked on the position that is protruded downstream than the normal stack position, whereby the presence of the remaining sheet may be noticed by the user.

Furthermore, the controller unit 100 operates the roller, provided most downstream, and the second most downstream roller at a higher speed than the conveying speed during the conveying operation. Thus, if the trailing edge of the remaining sheet is nipped by the second most downstream conveyance roller, the presence of the remaining sheet for the previous different job may be noticed by the user.

Furthermore, the controller unit 100 operates the roller, provided most downstream in the conveying direction of the document sheet S, in the direction opposite to the conveying direction during the conveying operation for the first job that is executed after the power source of the ADF 5 is turned on. Thus, the state where the trailing edge of the remaining sheet is located downstream of the most downstream sensor so that the remaining sheet is not detected is changed to the state where it is detected, whereby the remaining sheet may be noticed by the user due to paper jam detection.

Furthermore, the controller unit 100 operates the roller, provided most downstream, and the second most downstream roller in the direction opposite to the conveying direction during the conveying operation. Thus, even if the most downstream sensor is located upstream of the second most downstream conveyance roller, the remaining sheet may be noticed by the user due to paper jam detection.

An embodiment provides an automatic document feeder, an image forming device, and an image reading device, in which an initialization operation is performed only when a predetermined condition is satisfied, whereby noises of the device can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An automatic document feeder comprising:
   a recording-medium tray, on which a recording medium is set;
   a recording-medium set detector configured to detect whether the recording medium is set on the recording-medium set unit;
   a conveying device configured to convey the recording medium set on the recording-medium set unit;

a sheet-feeding cover section that includes a sheet feeding cover having a position that varies between an open position and a closed position; and a controller configured to,
receive a power-on signal, if a power source of an image forming device is turned on,
receive an energy-saving return signal, if the image forming apparatus returns from an energy saving state,
perform an initialization operation to initialize each unit of the automatic document feeder, if the controller receives the power-on signal,
determine whether to skip the initialization operation when the image forming apparatus returns from the energy saving state based on whether the image forming apparatus returned from the energy savings state due to a change in the position of the sheet feeding cover, and
skip the initialization operation when the image forming apparatus returns from the energy saving state, if the image forming apparatus returned from the energy savings state due to the change in the position of the sheet feeding cover.

2. The automatic document feeder according to claim 1, wherein, the controller is configured to receive the energy-saving return signal and perform the initialization operation, if the sheet feeding cover changes from an open state to a closed state while the image forming apparatus is in the energy saving state.

3. The automatic document feeder according to claim 1, wherein, the controller is configured to receive the energy-saving return signal and not perform the initialization operation, if the recording medium set detector detects that the recording medium is set while the sheet feeding cover is closed in the energy saving state.

4. An image reading device comprising:
the automatic document feeder according to claim 1.

5. An image forming device comprising:
the image reading device according to claim 4.

6. An image forming device comprising:
the automatic document feeder according to claim 1.

7. An automatic document feeder comprising:
a sheet stacking tray, on which a document sheet is stacked;
a sheet separating device configured to separate and individually feed the document sheet;
a conveying device including conveying rollers configured to convey the document sheet to a read position;
a scanner configured to read an image on the document sheet;
a sheet ejection device including sheet ejection rollers configured to eject the document sheet, and
a plurality of sensors configured to detect a position of the document sheet as the document sheet is conveyed by the conveying rollers and ejected by the sheet ejection rollers, the plurality of sensors including a downstream sensor provided furthest downstream in a conveying direction of the document sheet among the plurality of sensors and the downstream sensor being located upstream of a downstream roller furthest downstream in the conveying direction among the conveying rollers and the ejection rollers; and a controller configured to,
perform an initialization operation to initialize each unit of the automatic document feeder, and
perform a remaining-sheet treatment to discharge a previous document sheet that remains from a previous job by rotating the downstream roller after the initialization operation is complete such that the remaining-sheet treatment is performed, after a state where an image is readable is established for a current job, the previous job being a job preceding the current job.

8. The automatic document feeder according to claim 7, wherein the controller is configured to complete the remaining-sheet treatment before a leading edge of a first one of the document sheets reaches the read position, if the conveying device conveys the first one of the document sheets after the power source of the automatic document feeder is turned on.

9. The automatic document feeder according to claim 7, wherein, during the remaining-sheet treatment, the controller is configured to perform control such that ones of the plurality of rollers that are located downstream of the downstream sensor, operate at an identical conveying speed.

10. The automatic document feeder according to claim 7, wherein, during the remaining-sheet treatment, the controller is configured to perform control such that a conveying distance of the downstream roller is equal to or greater than a distance from the downstream sensor.

11. The automatic document feeder according to claim 7, wherein, when a number of a driving source of the downstream roller is one, the controller is configured not to perform the remaining-sheet treatment.

12. The automatic document feeder according to claim 7, wherein, the controller is configured to cause at least the downstream roller to operate at a higher speed than a conveying speed in the conveying operation, if the conveying device is conveying a first one of the document sheets after the power source of the automatic document feeder is turned on.

13. The automatic document feeder according to claim 12, wherein the controllers causes the downstream roller and a second most downstream roller among the plurality of rollers to operate at a higher speed than the conveying speed in the conveying operation.

14. The automatic document feeder according to claim 7, wherein, the controller is configured to cause at least the downstream roller to operate in a direction opposite to the conveying direction in the conveying operation, if the conveying device is conveying a first one of the document sheets after the power source of the automatic document feeder is turned on.

15. The automatic document feeder according to claim 14, wherein the controller is configured to cause the downstream roller and a second most downstream roller among the plurality of rollers to operate in the direction opposite to the conveying direction in the conveying operation.

16. An image reading device comprising:
the automatic document feeder according to claim 7.

17. An image forming device comprising:
the image reading device according to claim 16.

18. An image forming device comprising:
the automatic document feeder according to claim 7.

* * * * *